United States Patent
Yuhan et al.

(10) Patent No.: US 8,165,028 B1
(45) Date of Patent: Apr. 24, 2012

(54) MONITORING IN COMMUNICATION SYSTEM WITH WIRELESS TRUNK

(75) Inventors: Albert H. Yuhan, Randolph, NJ (US); Philip Douglas, Munich (DE); Ismail I. Sola, Colorado Springs, CO (US); Narayan P. Menon, Colorado Springs, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/987,872

(22) Filed: Dec. 10, 1997

(51) Int. Cl.
*G06F 11/00* (2006.01)

(52) U.S. Cl. ........ 370/242; 370/216; 370/243; 370/244; 370/245; 370/310.2; 370/328; 370/338; 455/8; 455/422.1; 714/4.1; 714/25; 714/48; 714/49; 714/57

(58) Field of Classification Search ................. 455/554, 455/555, 423, 424, 425, 435, 67.1–67.7, 455/404, 8, 422.1; 370/242–245, 246, 247, 370/250, 340, 327, 216–228, 310.2, 328–339, 370/349; 340/825.16, 825.32, 825.36, 539; 379/26, 33, 28, 29, 37; 714/2, 4.1, 4.11, 714/4.2, 25–31, 48–57
See application file for complete search history.

(56) References Cited

U.S. PATENT DOCUMENTS

| | | | |
|---|---|---|---|
| 3,711,647 A | 1/1973 | Boyer | 179/2 |
| 3,856,982 A | 12/1974 | Lawson et al. | 179/90 |
| 3,912,875 A | 10/1975 | Katz | 179/41 |
| 3,974,343 A | 8/1976 | Cheney et al. | 179/18 |
| 4,005,269 A | 1/1977 | Willis | 179/2 C |
| 4,012,596 A | 3/1977 | West, Jr. et al. | 179/41 |
| 4,028,500 A | 6/1977 | McClure et al. | 179/41 |
| 4,071,711 A | 1/1978 | Beaupre et al. | 179/41 |
| 4,122,304 A | 10/1978 | Mallien, II | 179/2 |
| 4,176,254 A | 11/1979 | Tuttle et al. | 179/5 R |

(Continued)

OTHER PUBLICATIONS

Telular Prospectus, Jan. 27, 1994.

(Continued)

*Primary Examiner* — Aung S Moe
*Assistant Examiner* — Hoon J Chung
(74) *Attorney, Agent, or Firm* — Blakely, Sokoloff, Taylor & Zafman LLP

(57) ABSTRACT

A communication system having a wireless trunk for connecting multiple phone lines over wireless communication links to a cellular network comprises a central telephone switch, such as a private branch exchange or key system, connected through one or more trunk lines to a wireless access communication unit. The wireless access communication unit preferably comprises a separate subscriber interface for each trunk line from the central telephone switch. The wireless access communication unit collects data from each of the subscriber interfaces, formats the data into a format compatible with an over-the-air protocol, and transmits the information over one or more wireless channels to a cellular base station. The wireless access communication unit thereby connects calls received from the central telephone switch's trunk lines over a wireless trunk to a network. A controller within the wireless access communication unit interfaces the subscriber interfaces with a radio transceiver, and assists in the conversion of data from a format suitable for wireless transmission. The controller also assists in distributing data received over the wireless trunk to the separate subscriber interfaces, and converting the data to a format suitable for communication with the central telephone switch. Calls may be selectively routed by the central telephone switch over landlines, instead, to the wireless access communication unit, thereby bypassing landlines.

24 Claims, 15 Drawing Sheets

CPRU Alarm Reporting

U.S. PATENT DOCUMENTS

| | | | | |
|---|---|---|---|---|
| 4,234,764 | A | | 11/1980 | Beebe ............................... 179/90 |
| 4,347,501 | A | * | 8/1982 | Akerberg ..................... 340/519 |
| 4,369,516 | A | | 1/1983 | Byrns ........................... 375/110 |
| 4,425,480 | A | | 1/1984 | Lischin ........................... 179/90 |
| 4,555,592 | A | | 11/1985 | Deinzer ............................ 179/2 |
| 4,562,307 | A | | 12/1985 | Bursztejn et al. ................. 179/2 |
| 4,567,588 | A | | 1/1986 | Jerrim ............................. 370/18 |
| 4,568,800 | A | | 2/1986 | Orikasa ............................. 179/2 |
| 4,577,182 | A | | 3/1986 | Millsap et al. ................ 340/539 |
| 4,601,047 | A | | 7/1986 | Horwitz et al. ................ 375/2.2 |
| 4,635,285 | A | | 1/1987 | Coombes ........................ 379/63 |
| 4,658,096 | A | | 4/1987 | West, Jr. et al. ................. 379/59 |
| 4,658,304 | A | | 4/1987 | Tsunekawa et al. .......... 358/310 |
| 4,677,656 | A | | 6/1987 | Burke et al. .................... 379/63 |
| 4,688,210 | A | | 8/1987 | Eizenhofer et al. ............. 370/18 |
| 4,724,435 | A | | 2/1988 | Moses et al. .................. 340/870 |
| 4,724,538 | A | | 2/1988 | Farrell ............................ 379/59 |
| 4,737,975 | A | | 4/1988 | Shafer ............................ 379/58 |
| 4,765,753 | A | | 8/1988 | Schmidt .......................... 379/60 |
| 4,775,997 | A | | 10/1988 | West, Jr. et al. ................. 379/58 |
| 4,868,519 | A | | 9/1989 | Shafer ........................... 330/284 |
| 4,922,517 | A | | 5/1990 | West, Jr. et al. ................. 379/58 |
| 4,937,852 | A | | 6/1990 | Manzarek ....................... 379/61 |
| 4,959,851 | A | | 9/1990 | Tobolski, Jr. et al. ........... 379/59 |
| 4,975,926 | A | | 12/1990 | Knapp .............................. 375/1 |
| 4,984,247 | A | | 1/1991 | Kaufmann et al. ............... 375/1 |
| 5,040,237 | A | * | 8/1991 | Barnes et al. ..................... 455/8 |
| 5,046,066 | A | | 9/1991 | Messenger .................. 370/94.1 |
| 5,099,493 | A | | 3/1992 | Zeger et al. ....................... 375/1 |
| 5,117,450 | A | | 5/1992 | Joglekar et al. ................. 379/58 |
| 5,128,979 | A | * | 7/1992 | Reich et al. ..................... 379/40 |
| 5,134,651 | A | | 7/1992 | Ortiz et al. .................... 379/112 |
| 5,151,920 | A | | 9/1992 | Haagh et al. ...................... 375/1 |
| 5,187,808 | A | * | 2/1993 | Thompson .................... 455/518 |
| 5,200,956 | A | | 4/1993 | Pudney et al. ............... 370/95.1 |
| 5,206,881 | A | | 4/1993 | Messenger et al. ............... 375/1 |
| 5,231,646 | A | | 7/1993 | Heath et al. ....................... 375/1 |
| 5,243,641 | A | | 9/1993 | Evans et al. ..................... 379/61 |
| 5,260,967 | A | | 11/1993 | Schilling ........................... 375/1 |
| 5,276,680 | A | * | 1/1994 | Messenger |
| 5,276,703 | A | | 1/1994 | Budin et al. ...................... 375/1 |
| 5,278,890 | A | | 1/1994 | Beeson, Jr. et al. ............. 379/57 |
| 5,285,469 | A | | 2/1994 | Vanderpool ....................... 375/1 |
| 5,303,286 | A | | 4/1994 | Wiedeman ...................... 379/59 |
| 5,303,287 | A | | 4/1994 | Laborde .......................... 379/59 |
| 5,319,634 | A | | 6/1994 | Bartholomew et al. ......... 370/18 |
| 5,337,342 | A | | 8/1994 | Kruger et al. ................... 379/40 |
| 5,343,496 | A | | 8/1994 | Honig et al. ....................... 375/1 |
| 5,361,297 | A | | 11/1994 | Ortiz et al. .................... 379/201 |
| 5,402,413 | A | | 3/1995 | Dixon ............................. 370/18 |
| 5,428,821 | A | | 6/1995 | Krisna et al. ................... 455/54 |
| 5,455,822 | A | | 10/1995 | Dixon et al. .................... 370/18 |
| 5,467,367 | A | | 11/1995 | Izumi et al. .................... 375/206 |
| 5,475,735 | A | | 12/1995 | Williams et al. ................ 379/59 |
| 5,481,533 | A | | 1/1996 | Honig et al. ..................... 370/18 |
| 5,488,631 | A | | 1/1996 | Gold et al. ..................... 375/206 |
| 5,504,804 | A | * | 4/1996 | Widmark ......................... 379/63 |
| 5,506,837 | A | | 4/1996 | Sollner et al. ................... 370/31 |
| 5,535,260 | A | | 7/1996 | Zicker et al. .................... 379/63 |
| 5,537,458 | A | | 7/1996 | Suomi et al. .................... 379/59 |
| 5,548,583 | A | | 8/1996 | Bustamante .................... 370/18 |
| 5,577,029 | A | | 11/1996 | Lu et al. .......................... 370/54 |
| 5,596,625 | A | | 1/1997 | LeBlanc ......................... 379/60 |
| 5,652,570 | A | * | 7/1997 | Lepkofker ..................... 370/573 |
| 5,671,219 | A | | 9/1997 | Jensen et al. .................. 370/280 |
| 5,724,647 | A | | 3/1998 | Sato ............................. 455/54.1 |
| 5,745,849 | A | * | 4/1998 | Britton .......................... 455/404 |
| 5,749,045 | A | * | 5/1998 | Benz et al. .................. 455/31.2 |
| 5,787,355 | A | * | 7/1998 | Bannister et al. ............. 455/458 |
| 5,859,838 | A | * | 1/1999 | Soliman ........................ 370/249 |
| 5,862,201 | A | * | 1/1999 | Sands ............................ 379/26 |
| 5,887,251 | A | * | 3/1999 | Fehnel ........................... 455/411 |
| 5,898,921 | A | * | 4/1999 | Liinamaa et al. ............. 455/423 |
| 5,983,117 | A | * | 11/1999 | Sandler et al. ................ 455/557 |
| 5,995,843 | A | * | 11/1999 | Sjodin et al. .................. 455/462 |
| 6,226,280 | B1 | | 5/2001 | Roark et al. ................... 370/330 |
| 6,230,286 | B1 | * | 5/2001 | Shapiro et al. .................. 714/23 |
| 6,255,945 | B1 | * | 7/2001 | Britton ......................... 340/539 |

OTHER PUBLICATIONS

Indoor Radio Communications Using Time-Division Multiple Access with Cyclical Slow Frequency Hopping and Coding, Adel A.M. Saleh, Leonard J. Cimini, Jr. IEEE Journal on Selected Areas in Communications, vol. 7, No. 1, Jan. 1989, pp. 59-70.

Universal Digital Portable Radio Communications, Donald C. Cox, Proceedings of the IEEE, vol. 754, No. 4, Apr. 1987.

E.F. Johnson, 1154 Cellular Mobile Transceiver Service Manual; Jun. 1985.

Glenayre, GL2020 Mobile Telephone Operating Instructions; Glenayre Electronics (Applicant believes that date of publication is prior to Jul. 1995).

Fixed Subscriber Radio Systems at V.H.F. and U.H.F., Radio & Elec. Eng. Australia, A.J. Edwards, Dec. 1972.

"Notes on the Network" by AT&T Network Planning Division Fundamental Network Planning Section, AT&T, 1980.

"90935/36 Remote and Master Telephone/Radio Interface Modules", Installation & Maintenance Practice, Dantel, Inc., 1981.

"Cellnet adds data to cellular service" International News, Telephone Engineer & Management, Nov. 1, 1985.

"Celldata launched", British Telecom Journal, No. 3, (1985) vol. 6, Autumn.

"Low Bit-Rate Speech Coders Applicable in Mobile Satellite Communication Systems", Neviano Dal Degan and Fulvio Rusina, CSELT—Centrol Studie Laboratori Telecommunication S.p.A.—Via G. Reiss Rom oli, 274-10148.

Radio Subscriber System, NEC Res. Develop. (Japan) T. Miyawaki, M. Tanka, H. Orikasa, I. Hotta, Apr. 1979.

"Radio Linked Exchange and Concentrator Rural Telephone System" (RTS) 1975.

An Automatic, Fully Interconnected HF Radio Telephone System, E.W. Derbyshire, Canadian Marconi Company, Montreal, Canada (Applicant believes that the date of publication is prior to Jul. 1995).

GM's Hughes Unites is Said to Receive China Phone Job, Wall Street Journal Article, Jeff Cole, Apr. 13, 1993.

EXLOCRA: Local Extension by Radio, Francois P.M. Grandchanp, Telecommunications Journal, Aug. 1982.

Design of a Multiple Access Radio System for Rural Telephony, A. Golderos Sanchez, Telecommunications Journal, Nov. 1983.

Subscriber Radio Telephone System for Rural Areas, M. Komura, T. Miyaagawa, Y. Suzuki, J. Uehara, Japanese Telecommunications Journal, Apr. 1976.

Cellular Radio Telephony; Ericsson Review, 1987.

System Description; Nordic Mobile Telephone 1977.

Technical Manual; Canadian Marconi Company, Nov. 22, 1984.

User's Guide for AT&T 3730/3710 or OKI 900/910 Portable Cellular Telephones; Cellular/Data Link, 1993.

New Rural Radiotelephone Brings Normal Service to Near-Impossible Areas, John W. Hagen, Telephony, Sep. 1975.

The Problem of Radio Telephone Systems for Rural Subscribers; F. Barresi, D. Ongaro, M. Saba, S. Urbano, I.C.C., Jun. 1978.

Ericsson Radio Systems, "PayPhone", Dec. 19, 1984, Rev. A.

Ericsson Radio Systems, "Coinbox-Interface", Dec. 19, 1984, Rev. A.

Ericsson Radio Systems, "Radio Interference", Dec. 20, 1984 Rev. A.

Ericsson Radio Systems, "Payphone", Dec. 20, 1984, Rev. A.

Ericsson Radio Systems, "Coinbox-Interface", Dec. 20, 1984.

Valtion Teknillinen Tutkimuskeskus documentation of prototype for NMT coin telephone adapter dated Apr. 30, 1983 and English translation.

Description of Automatic Coastal Radio Network (ARRV) and English Translation (Applicant believes that the date of publication is prior to Jul. 1995).

Valtion Teknillinen Tutkimuskeskus press release of successful trial of Valtion Teknillinen Tutkimuskeskus developed adaptor for connecting coin telephone to NMT, (Applicant believes that the date of publication is prior to Jul. 1995) and English Translation.

Minutes of Valtion Teknillinen Tutkimuskeskus confirming completion of project to develop a prototype to test feasibility of wireless NMT coin telephone service dated Jun. 27, 1983 and English Translation.

PTT request for proposal for wireless NMT coin telephone service and English translation, dated Apr. 19, 1982.

PTT purchase order accepting Valtion Teknillinen Tutkimuskeskus proposal set forth in their proposal dated Jun. 18, 1982 and English translation.

Valtion Teknillinen Tutkimuskeskus proposal for developing adaptor for coin telephone connection to NMT system dated May 17, 1982 and English Translation.

PTT press release of successful trial of Valtion Teknillinen Tutkimuskeskus developed adaptor for connecting coin telephone to NMT dated May 13, 1983.

PTT memo on proposal implementation of NMT coin telephone system dated Apr. 3, 1981 in Finnish language and English Translation.

Letter from Valtion Teknillinen Tutkimuskeskus to PTT confirming an acceptance of proposal dated Aug. 4, 1982 and English Translation.

Original PTT project specification for wireless NMT coin telephone service (3 versions) Nov. 9, 1981, Sep. 6, 1983 and Jan. 15, 1985.

* cited by examiner

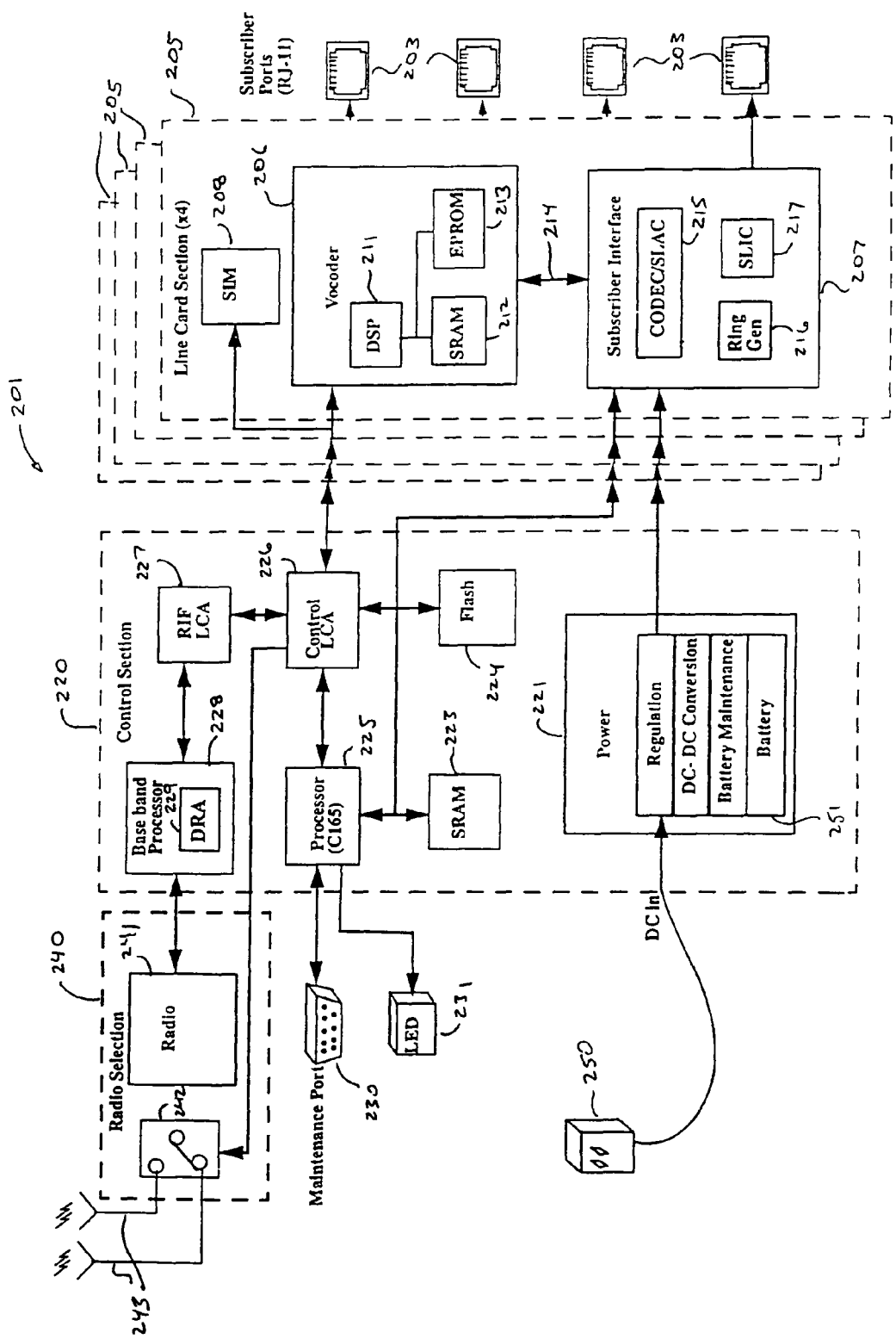
Figure 2  CPRU Basic Architecture

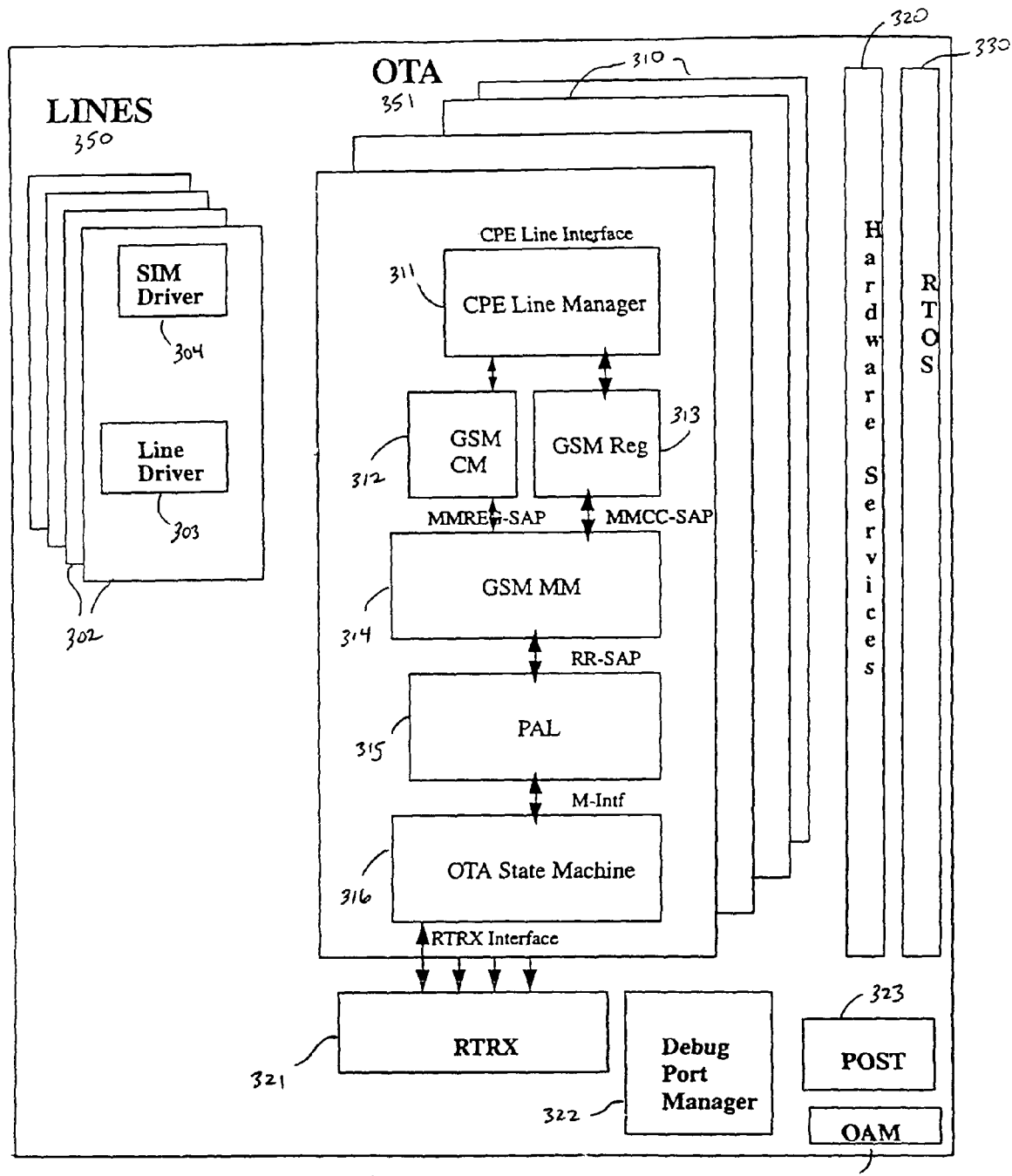
Figure 3    CPRU Software Architecture

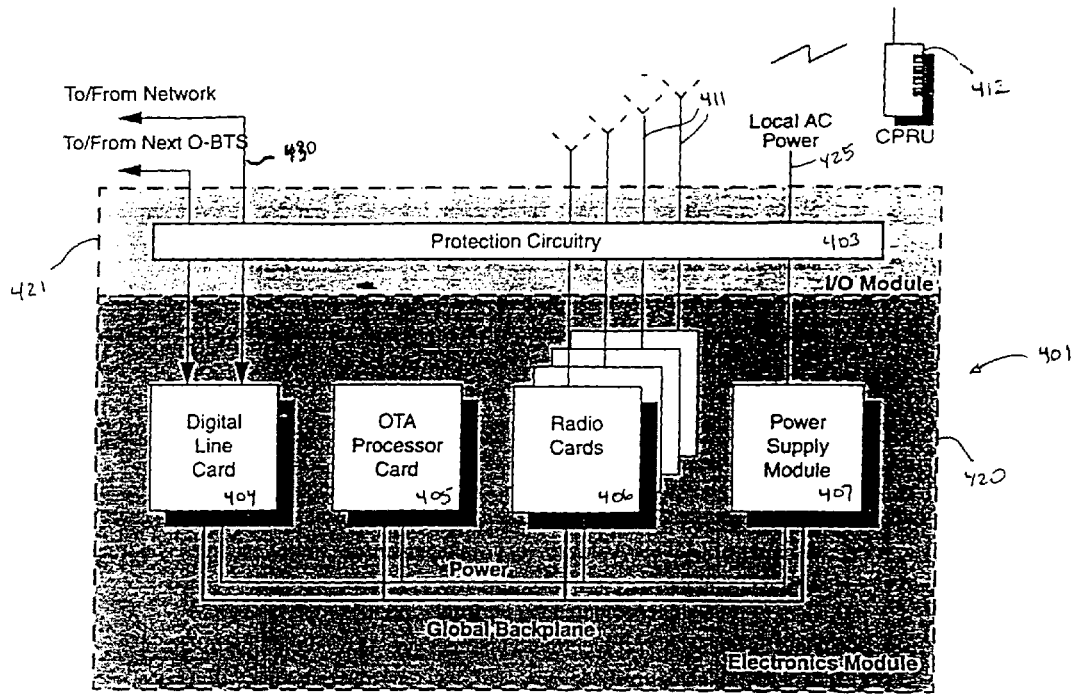
Figure 4    BS Physical Components
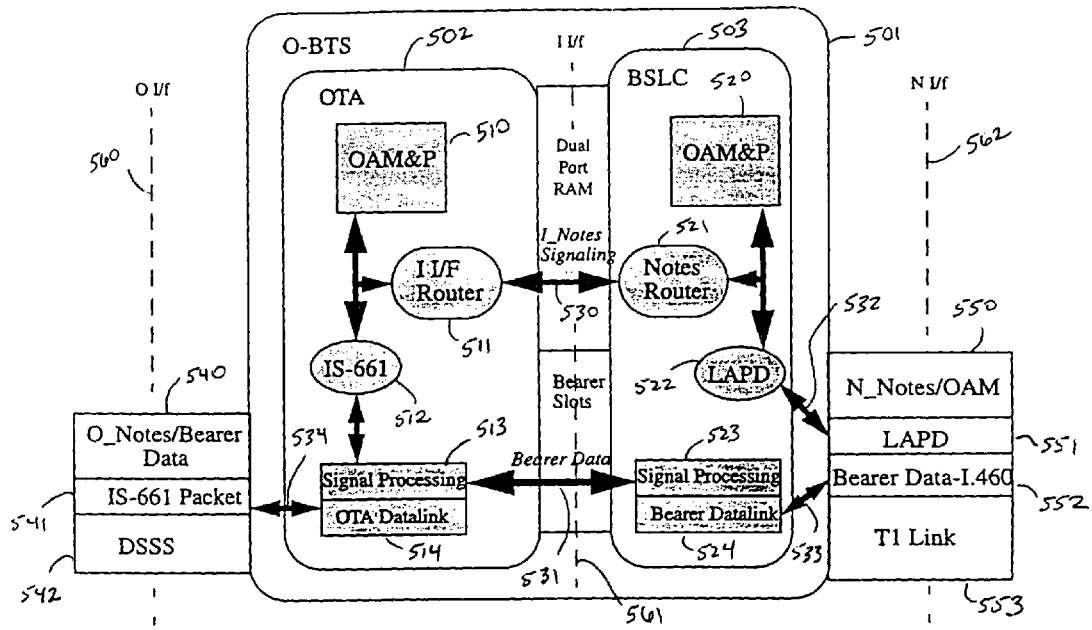
Figure 5    BS High Level Software Architecture

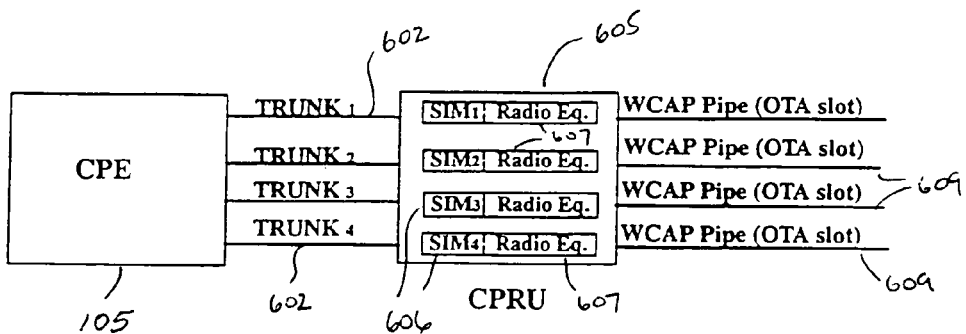
Figure 6
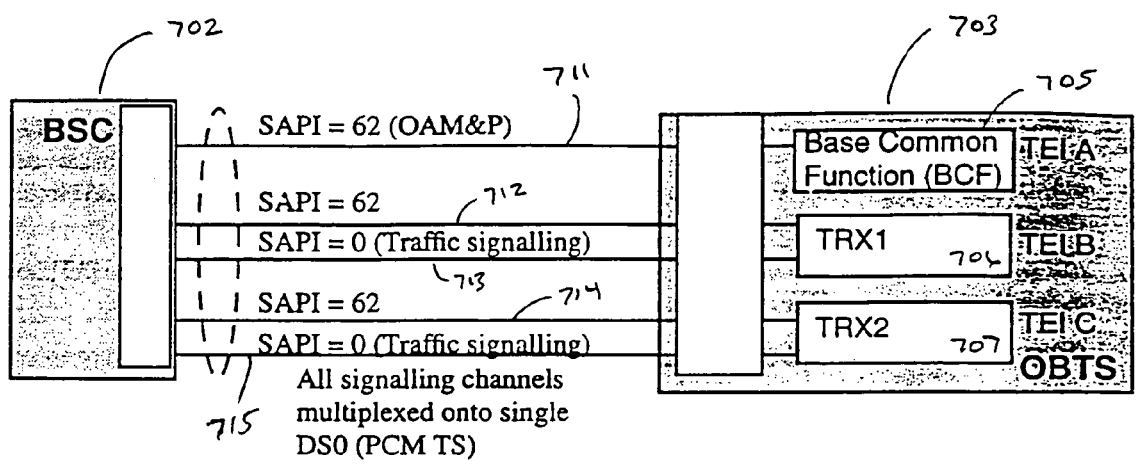
Figure 7  Interface signalling structures

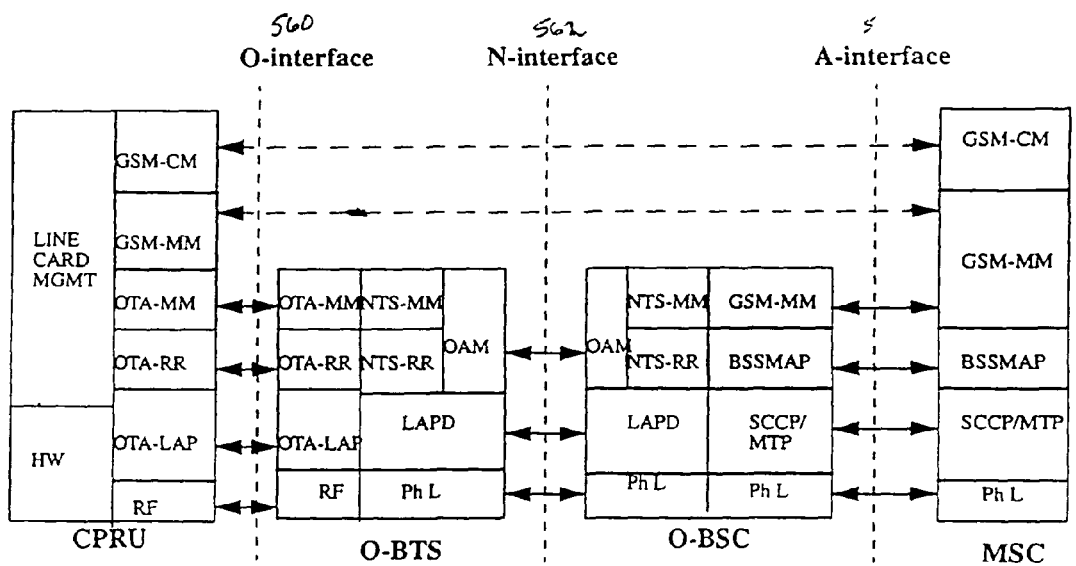

CM-- Connection Management
MM-- Mobility Management
OTA-- Over-the-air protocol
LAPD-- Link Access Protocol for D channel
IWF-- Interworking Function
Ph L-- Physical Layer BSSMAP-- Base Station Subsystem Management Application Part
SCCP-- SS7 Signaling Connection Control Part
MTP-- Message Transfer Part (MTP Layers 2 & 3)
OAM-- Operations, Maintenance & Administration
NTS-MM-- N-Notes Mobility Management
NTS-RR-- N-Notes Radio Resource Management Figure 8     System protocol architecture

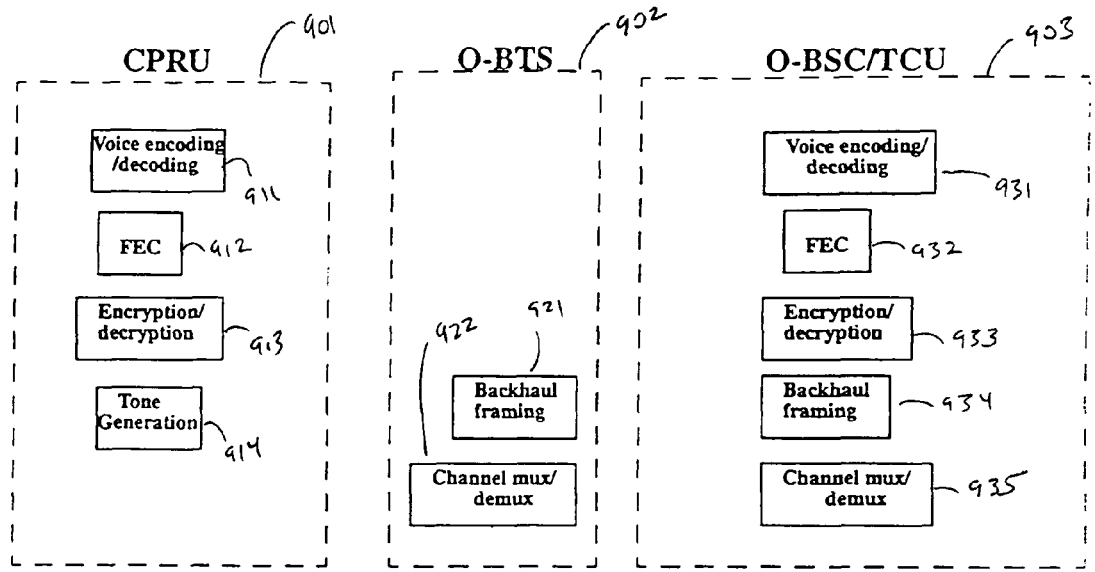
Figure 9  Bearer path functions
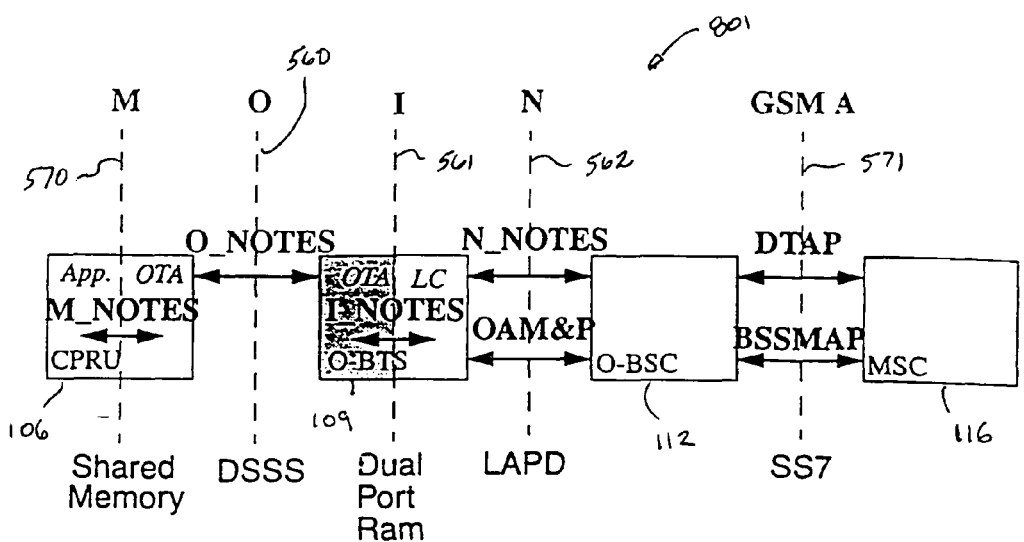
Figure 10

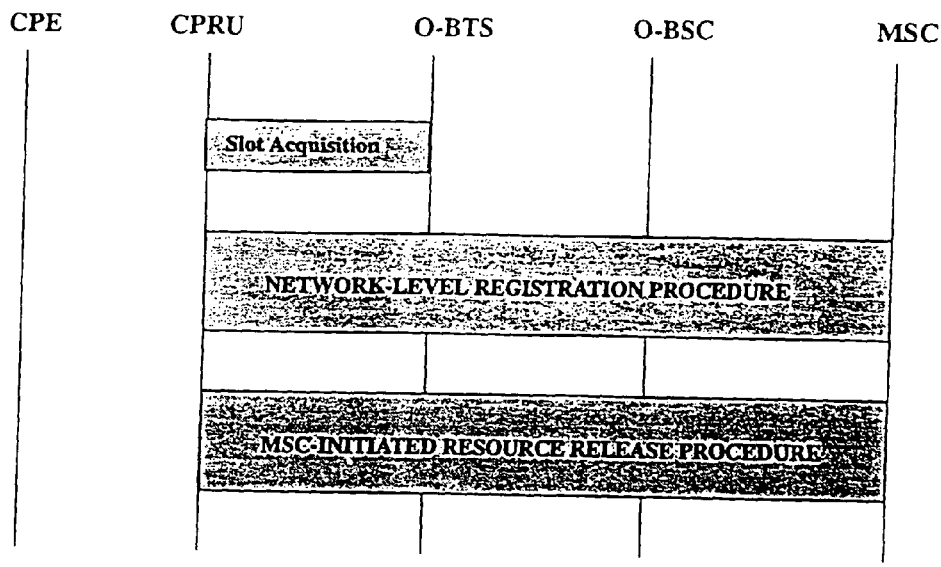
Figure 12  Network-level Registration
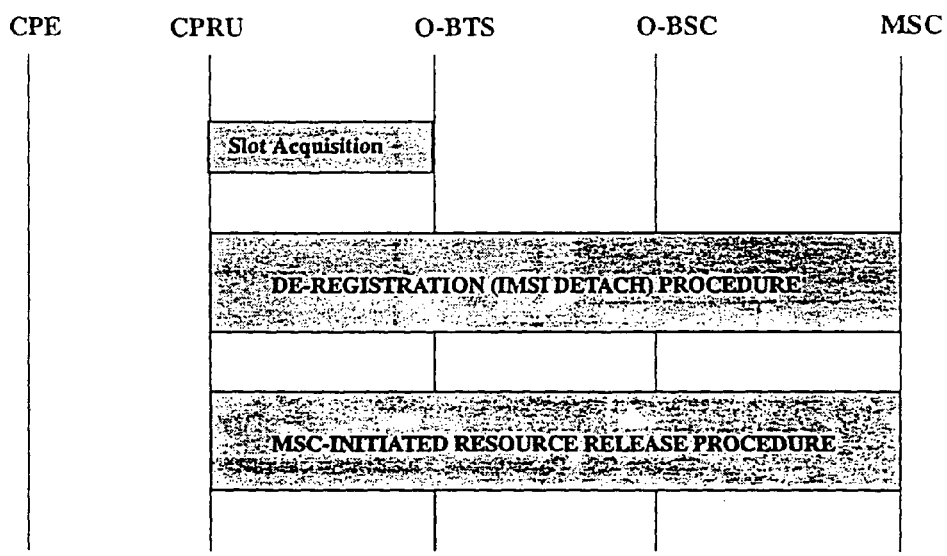
Figure 13  De-registration

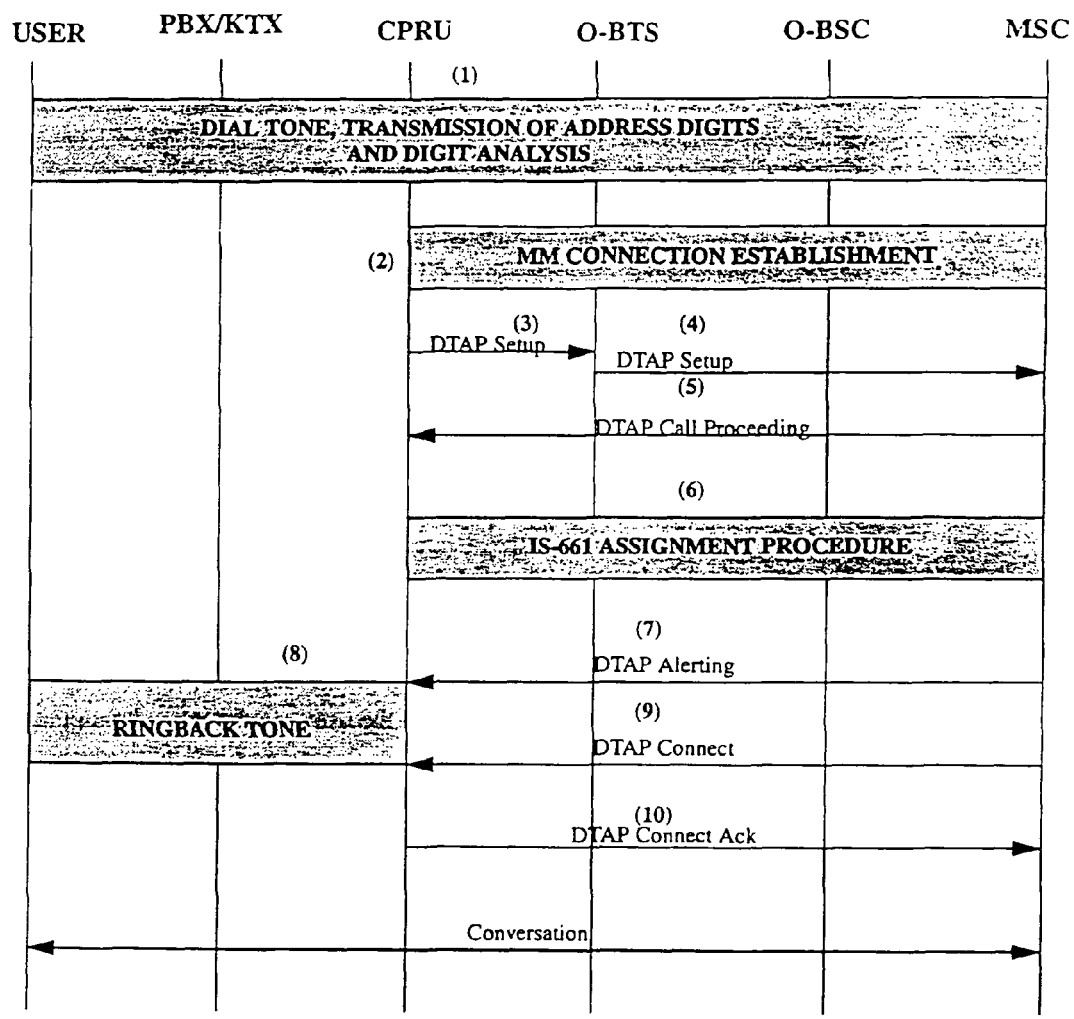
Figure 14 Successful Outgoing Call Setup (Non-PSTN Interworking)

SUCCESSFUL OUTGOING CALL SETUP (PSTN INTERWORKING)

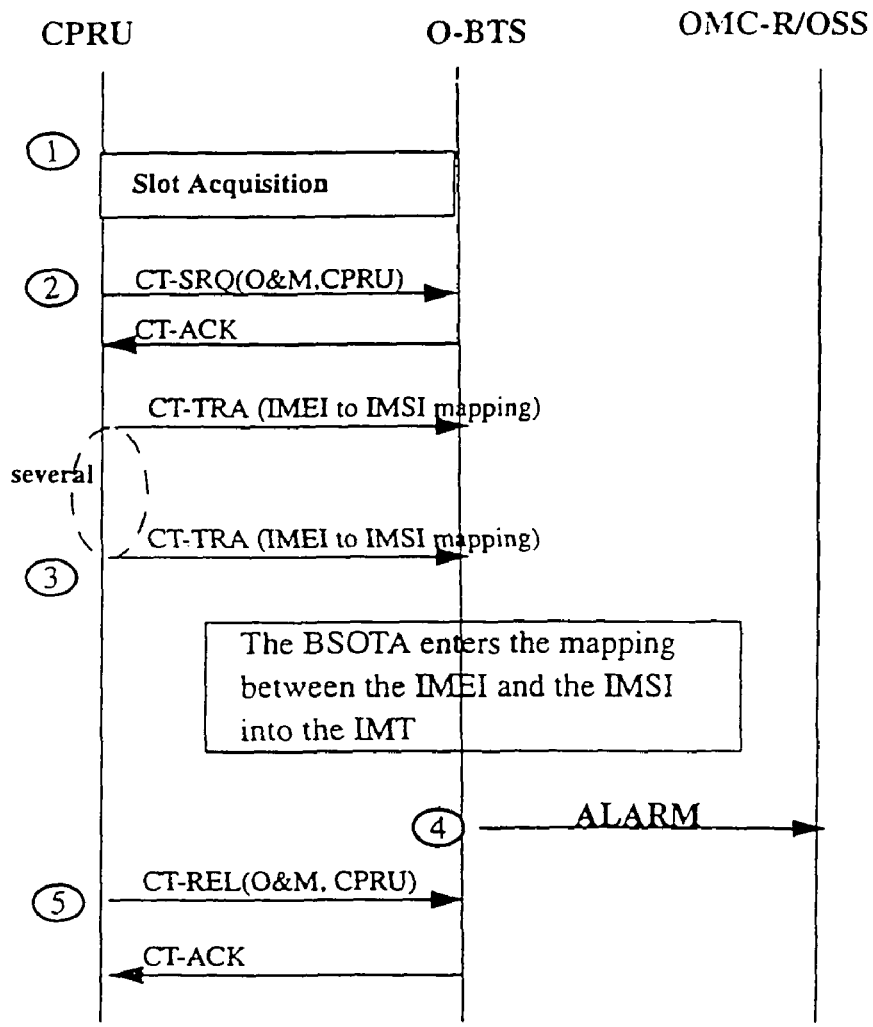
FIG. 18   Power-On/Base level Registration (Geographic)

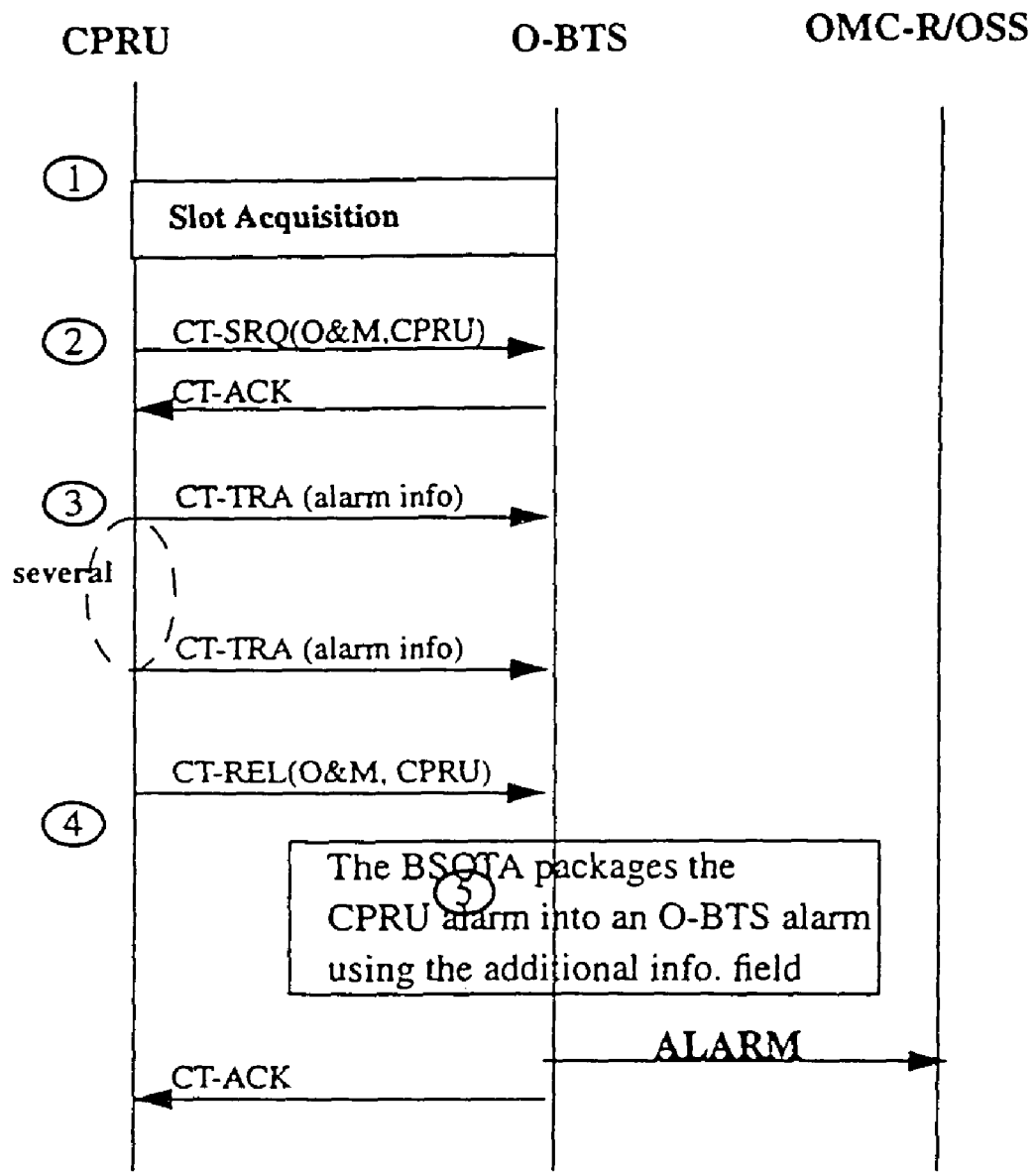
FIG. 19    CPRU Alarm Reporting

MONITORING IN COMMUNICATION SYSTEM WITH WIRELESS TRUNK

BACKGROUND OF THE INVENTION

1) Field of the Invention

The field of the present invention relates to a method and system for providing communication services, for monitoring and for providing alarms or fault notifications in a communication system.

2) Background

Localized telephone switching systems such as private branch exchanges (PBXs) and key type systems have for many years been available to business offices and other establishments as an alternative or adjunct to public telephone service. A PBX or key system allows users connected to the system to place intra-system telephone calls without accessing the public telephone service. Such a system can provide significant economic benefits, particularly if intra-system telephone traffic is heavy.

On the other hand, when callers using a PBX or key system need to place a call to a party not connected to the system, such outside calls must typically be routed through the PBX or key system controller over landlines to the public telephone company. To accommodate such dual functionality (i.e., intra-system call support and outside call support), special-purpose telephones have been developed for connection to a PBX or key system to allow manual routing of telephone calls. For example, deskset telephones can be provided with buttons corresponding to different telephone lines. By depressing the appropriate button, the user selects between certain designated lines for calls within the system, or different designated lines for calls over the public telephone network.

In other PBX and key systems call routing over the selected lines may be automatic. For example, the user may select an intra-system call or a call over the public telephone network according to the first digit dialed, and the PBX or key system then analyzes the first digit and routes the call to the proper destination using the appropriate vehicle.

While PBX and key systems are useful for providing economical coverage within a private local telephone system, for long distance the PBX users or key system users may still be required to rely on a local exchange carrier (LEC) whose landlines are connected to the PBX. The local exchange carrier then routes the call to along distance carrier. Because the user must pay both the local exchange carrier and long distance carrier for each long distance telephone call, long distance telephone service can be quite costly, particularly if the volume of long distance calls is large.

Besides high costs for long distance service, another potential disadvantage of existing PBX or key telephone systems is that deployment can be difficult or expensive in remote areas. For example, if long distance service or other public network services are required, then deployment of a PBX or key system is generally limited to where landlines have been laid, so that the PBX or key system can have a connection to a local exchange carrier which connects to the long distance provider. If no landlines are present in the desired deployment location, then it can be expensive to connect landlines to provide long distance access for the PBX or key system. Also, conventional PBX or key systems are generally not very mobile where they require an interface with landlines for long distance access or other types of public network services.

There is a need for a communication system having the ability of a PBX or key telephone system to manage local area calls, yet also which can provide access to lower cost, reliable long distance or other network services. There is also a need for a versatile mechanism for allowing PBX or key type systems to achieve relatively inexpensive access to network resources and long distance coverage. There is also a need for a communication system that employs a robust, flexible protocol for providing long distance coverage or other network services to local users of a PBX, key system or other type of local area network.

SUMMARY OF THE INVENTION

The invention provides in one aspect a communication system having a wireless trunk for connecting multiple phone lines over wireless communication links to a cellular network. In one embodiment of the invention, a central telephone switch or customer premises equipment (CPE), such as a private branch exchange or key system, is connected through one or more trunks to a wireless access communication unit. The wireless access communication unit provides the CPE with one or more wireless communication channels to a cellular network. Calls may be selectively routed by the CPE over landlines to a network or, instead, to the wireless access communication unit, thereby bypassing landlines. Multiple wireless access communication units in a geographical region can communicate with a single base station of the cellular network, so long as the base station capacity and current traffic load permit.

In another aspect of the invention, a wireless access communication unit is provided which has multiple trunk interfaces for connection to a CPE, and a radio transceiver for establishing one or more wireless communication links to a cellular network. Each trunk interface is connected to a line card comprising a vocoder and a subscriber interface. A controller interfaces the line cards with the radio transceiver, and assists in the conversion of data from a format suitable for wireless transmission to a format suitable for transmission over the CPE trunk, and vice versa. Data communicated between the wireless access communication unit and the network may be encrypted at the wireless access communication unit and decrypted at the mobile switching center or else at a separate transcoding unit interposed between the mobile switching center and the base station subsystem.

In another aspect of the invention, the wireless access communication unit registers each CPE trunk to which it is connected such that each CPE trunk appears as a subscriber to the network. Each CPE trunk may therefore be addressed by a unique subscriber identifier. The wireless access communication unit preferably utilizes aspects of GSM signaling to communicate information to the network, such that communication with a GSM-based network is carried out transparently by the wireless access communication unit.

In yet another aspect of the invention, the wireless access communication unit periodically re-registers each of its CPE trunks. The base station receives and monitors the re-registration signals from the wireless access communication unit and, if the re-registration signals are absent for a predefined period of time, issues an alarm message to the network. The wireless access communication unit may be provided with a unique equipment identifier so that the base station can correlate the different wireless links to a single wireless access communication unit.

In a preferred embodiment of the invention, the wireless access communication unit operates according to a protocol utilizing aspects of frequency division multiple access (FDMA), time division multiple access (TDMA) and/or code division multiple access (CDMA), whereby communication channels are assigned to the wireless communication unit on a demand basis. In a preferred embodiment, communication between the wireless access communication unit and a base station of the cellular network is carried out over a plurality of wireless duplex communication channels, one channel for each CPE trunk, with base transmissions in time slots on one frequency band and user transmissions (including those from the wireless access communication unit) in time slots on a different frequency band. In such an embodiment, the user time slots may be offset in time from the base time slots, and radio transmissions may be carried out using spread spectrum techniques.

Further embodiments, modifications, variations and enhancements of the invention are also disclosed herein.

BRIEF DESCRIPTION OF THE DRAWINGS

FIG. 2 is a block diagram of a basic architecture for a wireless access communication unit in accordance with various aspects of the present invention.

FIG. 3 is a diagram of a software architecture for the wireless access communication unit of FIG. 2.

FIG. 4 is a block diagram of a basic architecture for a base station.

FIG. 5 is a diagram of a software structure for the base station of FIG. 4.

FIG. 6 is a block diagram illustrating addressing of multiple trunks connected to a wireless access communication unit according to a preferred embodiment of the present invention.

FIG. 7 is a diagram illustrating an interface signaling structure between a base station and a base station controller.

FIG. 8 is an abstract diagram of a system protocol architecture.

FIG. 9 is a diagram illustrating a division of bearer path functions among a wireless access communication unit (CPRU), base station and base station controller components of a preferred communication system.

FIG. 10 is a diagram showing interfaces between the different components of a preferred system.

FIG. 12 is a call flow diagram for a network-level registration procedure.

FIG. 13 is a call flow diagram for a network-level de-registration procedure.

FIG. 14 is a call flow diagram for a successful outgoing call setup without PSTN interworking.

FIG. 18 is a call flow diagram illustrating network-level registration.

FIG. 19 is a call flow diagram illustrating alarm reporting.

DETAILED DESCRIPTION OF PREFERRED EMBODIMENTS

Figure 1:
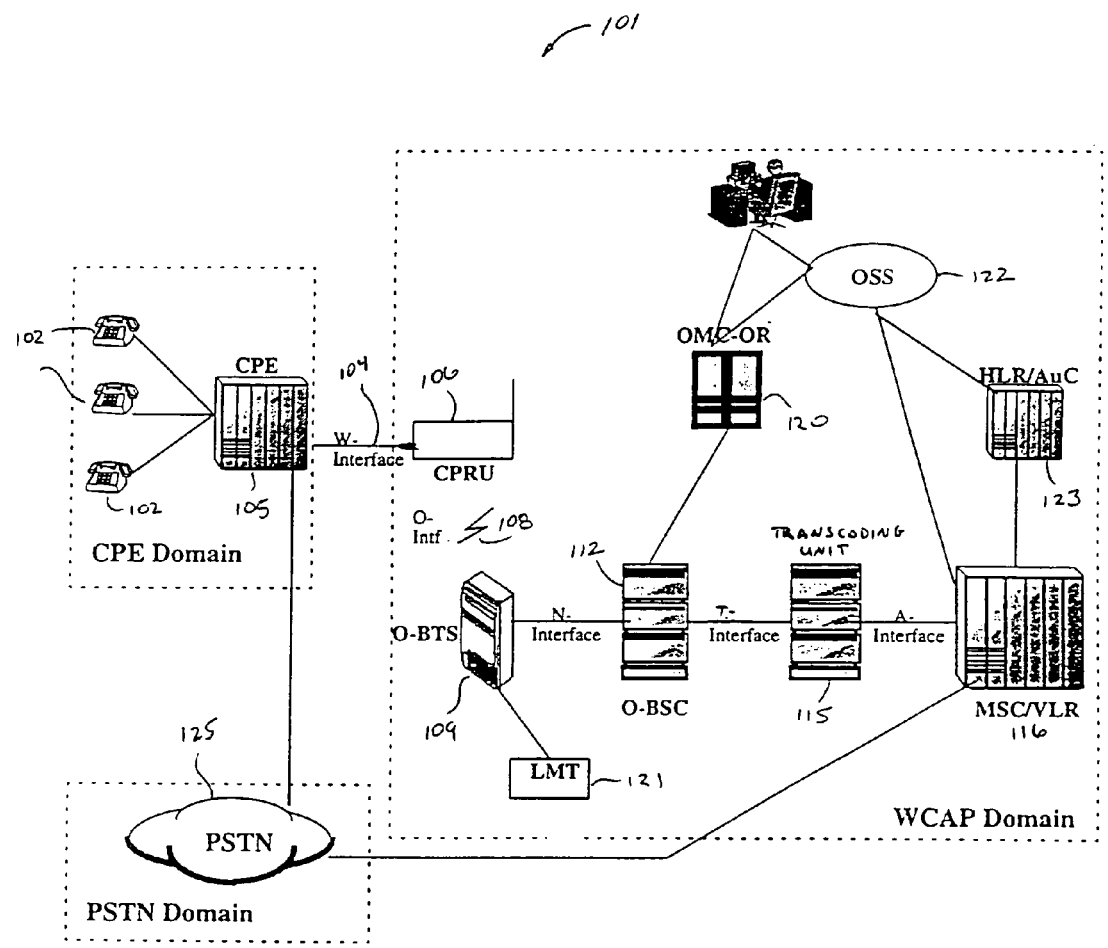
FIG. 1 is a diagram of an overall system architecture in accordance with a preferred embodiment of the present invention.
Figure 11:
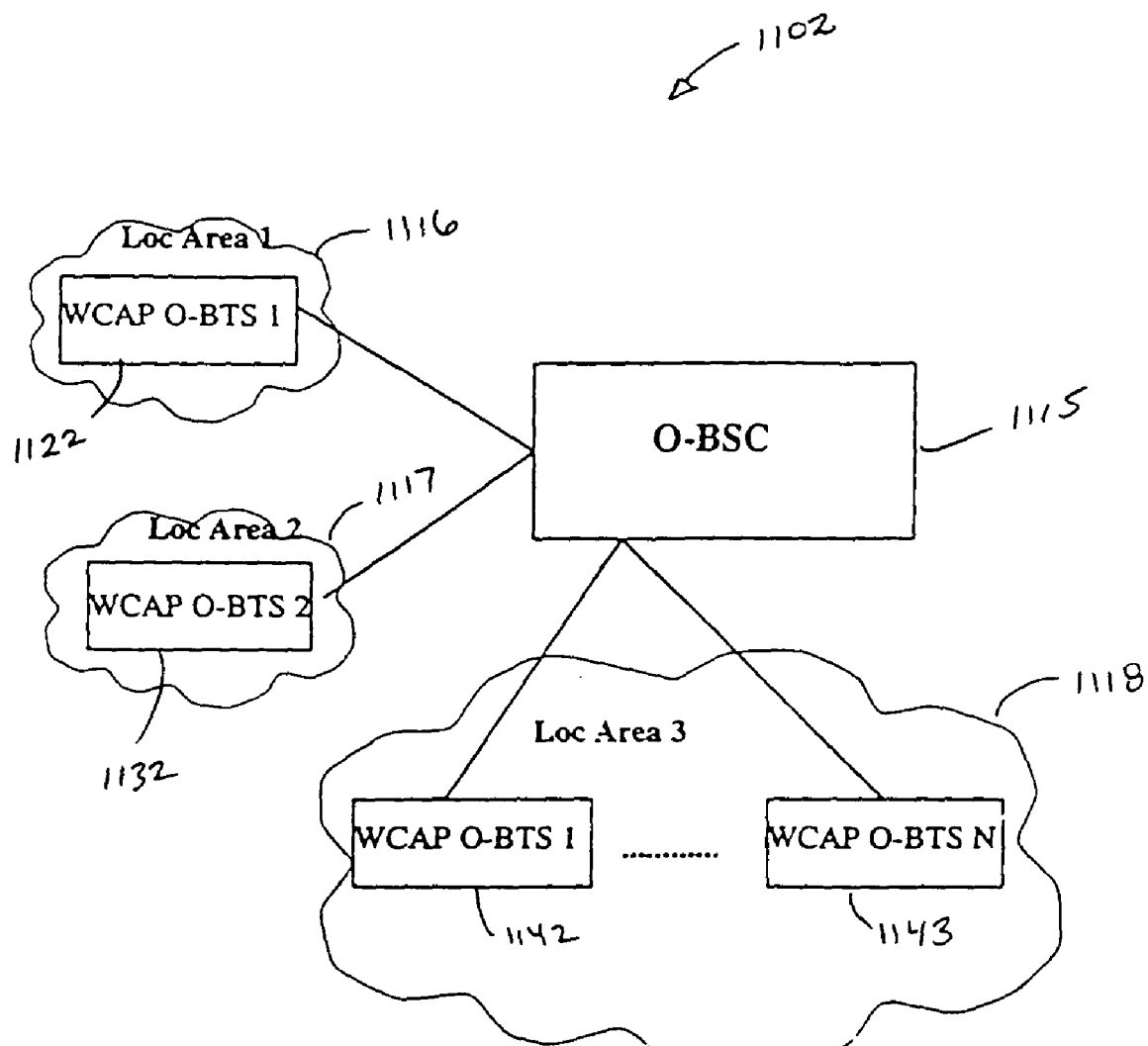
FIG. 11 is a diagram of multiple wireless access communication units in different location areas connected to a single base station controller.

FIG. 1 is a diagram showing an overall system architecture of a communication system 101 in accordance with a preferred embodiment of the present invention. In the system architecture illustrated in FIG. 1, a plurality of telephone stations 102 are connected to a central telephone switch 105. It will be understood that telephone stations 102 could comprise telephones, modems, fax machines, or other devices that are capable of communicating over a completed call connection. The central telephone switch 105 will be referred to herein as a "customer premises equipment" or "CPE." The CPE 105 may comprise, for example, a private-branch exchange (PBX) system or a key system. The design of various types of PBX and key systems is well known in the art.

In the preferred embodiment depicted in FIG. 1, the CPE 105 is connected to both a public switched telephone network (PSTN) 125 and a wireless access communication unit 106 (also referred to occasionally herein, or in the drawings, as a "customer premises radio unit" or "CPRU"). As described in more detail hereinafter, in a preferred embodiment calls are selectively placed over the PSTN 125 and the wireless access communication unit 106 according to the type of call. The wireless access communication unit 106 communicates over a wireless trunk 108 (which comprises a plurality of wireless communication links) to a base station 109. The base station 109 is connected, along with other base stations 109 in adjacent or nearby geographical regions, to a base station controller 112. The base station controller 112 is connected to a transcoding unit 115, which is connected to a mobile switching center (MSC) 116. Optionally, the base station controller 112 may be connected directly to the mobile switching center 116, without the intermediary transcoding unit 115. The mobile switching center 116 is connected to the PSTN 125.

In addition to being connected to the transcoding unit 115 or, optionally, the MSC 116, the base station controller 112 is also connected to an operations and maintenance center (OMC) 120, which is in turn connected to an operations support system (OSS) 122. The mobile switching center 116 is connected to a home location register and authentication center (HLR/AuC) 123 and to the operations support system 122, as shown in FIG. 1. The base station 109 may also be connected to a local management terminal 121.

As further described herein, the invention provides in one aspect monitoring of activity at the wireless access communication unit 106 and reporting of faults through alarm messages relayed from the wireless access communication unit 106 and/or base station 109. The wireless access communication unit 106 is preferably capable of performing self-diagnostic functions whereby communication faults, hardware faults, software faults and the like are detected. These faults are reported to the network through alarm messages. Also, the "health" of the wireless access communication unit 106 is continually monitored at the base station 109 by having the wireless access communication unit 106 periodically re-register with the base station 109. If a periodic re-registration event does not occur, the base station 109 assumes that the wireless access communication unit 106 has lost contact. These and further aspects of the invention are described in greater detail below, following a description of some of the basic components of a preferred system and the operation thereof.

In accordance with a preferred embodiment of the invention as depicted in FIG. 1, the wireless access communication unit 106 provides the capability to establish, maintain and tear down normal outgoing voice calls through a GSM-based segment that provides connectivity to the long distance functionality of the PSTN 125. The wireless access communication unit 106 and other system components provide wireline transparency to a CPE 105 by supporting standard signaling functions on the CPE interface, including trunk supervisory signaling, address signaling, and provision of call progress tones to the CPE 105.

In the preferred communication system 101 shown in FIG. 1, calls may be placed from telephone stations 102 directly over the PSTN 125 (i.e., over a landline connection), or over the wireless trunk 108 to the PSTN 125 by utilizing the wireless access communication unit 106. When a call is to be initiated at one of the telephone stations 102, it may be routed either directly to the PSTN 125 or to the wireless access communication unit 106. The routing of the call may be either based on manual selection, or accomplished automatically based on the number dialed, as further described herein. In a preferred embodiment, local telephone calls are routed directly to the PSTN 125, while long distance telephone calls are routed through the wireless access communication unit 106.

Operation of the system shown in FIG. 1 may depend in part on the nature of the CPE 105. As noted previously, the CPE 105 may comprise, for example, a PBX or a key-type system. In an embodiment where the CPE 105 comprises a PBX, the PBX is preferably capable of routing an outgoing call placed from a telephone station 102 to the PSTN 125 or to the wireless access communication unit 106 based on either an access digit or the telephone number dialed by the user. The user may, for example, dial a certain first digit (e.g., an '8') for access to the wireless access communication unit 106, and a different first digit (e.g., a '9') for direct LEC access to the PSTN 125. In this manner, the user could, for example, access the wireless access communication unit 106 to make outgoing long distance telephone calls, or the PSTN 125 for other types of outgoing calls. Alternatively, some types of PBXs can be configured to analyze the dialed number, and to route long distance and local calls. Utilizing this ability, the PBX can be configured to route long distance calls through the wireless access communication unit 106 and local or emergency calls through the PSTN 125.

In an embodiment where the CPE 105 comprises a key system, the user may manually select a line (either for the wireless access communication unit 106 or the PSTN 125) by depressing a key on the telephone deskset. The user could, for example, select the call processing unit 106 for outgoing long distance calls, and the PSTN 125 for other types of outgoing calls. Some key systems can, like certain PBXs, be configured to analyze the dialed number, and to route a call either to the wireless access communication unit 106 or the PSTN 125 depending on the initial digits of the call and/or the number of digits dialed. In this manner, the key system can, for example, be configured to route long distance calls through the wireless access communication unit 106, and local or emergency calls through the PSTN 125.

In alternative embodiments, the system may be configured with less flexibility but a potentially simpler architecture. For example, the system can be configured such that all incoming calls are routed directly from the PSTN 125 to the CPE 105, and that all outgoing local calls (whether voice or data), all outgoing long distance data calls, and all TTY calls for persons with disabilities are also routed directly through the PSTN 125. In such an embodiment, the wireless access communication unit 106 would generally provide outgoing long distance voice communication capabilities.

The CPE 105 is connected to the wireless access communication unit 106 across a CPE trunk interface 104. The CPE trunk interface 104 comprises a plurality of CPE trunks, each of which may comprise, for example, loop-start trunks or ground-start trunks. The design of both loop-start trunks and ground-start trunks is well known in the art. As is also well known to the practitioner in the art, both loop-start trunks and ground-start trunks can be supported by the same local area switching equipment (i.e, the same PBX or KTS).

In an embodiment in which the CPE 105 comprises a PBX, the PBX preferably has certain operating characteristics. In addition to supporting loop-start trunks or ground-start trunks (or both) on the CPE trunk interface 104 between the PBX and the wireless access communication unit 106, the PBX also preferably supports DTMF address signaling on the loop-start trunks or ground-start trunks. The PBX may be configured to route calls through either the PSTN 125 or the wireless access communication unit 106, as described previously, and therefore has the ability to identify which trunks lead to the PSTN 125 and which trunks lead to the wireless access communication unit 106. The PBX preferably has the ability to specify the order in which the trunk groups are tried when an outgoing call is placed, and to re-route outgoing long-distance calls through the PSTN 125 instead of the wireless access communication unit 106 in case of access problems from the wireless access communication unit 106 to the wireless system.

In an embodiment where the CPE 105 comprises a key telephone system (KTS), the KTS preferably has certain operational characteristics. In addition to being configured to support loop-start trunks or ground-start trunks (or both) on the CPE trunk interface 104 between the KTS and the wireless access communication unit 106, the KTS also preferably supports DTMF address signaling on the loop-start trunks or ground-start trunks, and has the ability to route calls through either the PSTN 125 or the wireless access communication unit 106, as described above. While not essential, the KTS may also be provided with supplementary call support features and a route selection feature (i.e., the ability to identify trunk groups leading to the wireless access communication unit 106 and the PSTN 125, and to specify on the KTS the order in which the trunk groups should be tried). If a route selection feature is provided, the KTS should have the ability to re-route outgoing long-distance calls through the PSTN 125 instead of the wireless access communication unit 106, in case there are access problems from the wireless access communication unit 106 to the wireless system.

The wireless access communication unit 106 acts as the gateway for wireless trunk access to the CPE 105 via the wireless system, and correlates the individual CPE trunks with wireless communication links such that calls from the CPE 105 can be completed over a wireless network. FIG. 6 is a diagram illustrating an embodiment of a wireless access communication unit 605 connected to a CPE 105 (see FIG. 1) across a plurality of CPE trunks 602 (in this example, four CPE trunks 602). The wireless access communication unit 605 also is connected over a plurality of wireless communication links (or "pipes") 609 to a wireless network and, in particular, to a base station (not shown in FIG. 6). The wireless access communication unit 605 establishes the wireless communication links 609 and correlates therewith the CPE trunks 602, so that communication for a particular CPE trunk 602 is carried out over an assigned wireless communication link 609. Users connected to the CPE 105 can obtain access to the wireless access communication unit 605 (and, hence, to the wireless network) by being connected through the CPE 105 to one of CPE trunks 602. In this manner, a potentially large number of users connected to the CPE 105 can have the ability to complete calls to the wireless network, with the number of users able to make calls simultaneously equaling the number of CPE trunks 602 (and wireless communication links 609) available.

Various components of the communication system shown in FIG. 1 will now be described in more detail. In addition, a detailed description of the preferred system interworking, protocols and related information appears hereinafter, and also appears in copending U.S. patent application Ser. Nos. 08/988,546 filed on Dec. 10, 1997, 08/987,872 filed on Dec. 10, 1997, 09/812,534 filed on Mar. 19, 2001, 08/988,505 filed on Dec. 10, 1997, 08/988,262 filed on Dec. 10, 1997 and 08/987,893 filed on Dec. 10, 1997, each of which is filed concurrently herewith, and each of which is hereby incorporated by reference as if set forth fully herein.

The wireless access communication unit 106, as noted, acts as the gateway for the CPE 105 to the wireless network, and preferably perform a variety of functions. In a preferred embodiment, the wireless access communication unit 106 performs off-hook detection for outgoing calls and support provision of a dial tone to the CPE 105 (and thereby to the telephone station 102 initiating the call). The wireless access communication unit 106 also initiates acquisition of a wireless communication channel (such as an over-the-air time slot, for example, if the wireless network is a TDMA and/or TDD system), and initiates call control procedures. During call establishment, the wireless access communication unit 106 detects dialed address digits (i.e. DTMF tones) and passes the received digits via call control signaling to the network. The wireless access communication unit 106 decides whether to launch a normal or emergency call depending upon an end-of-dialing indication received from the base station 109 indicating the type of call (based on digit analysis performed at the base station 109). In addition, the wireless access communication unit 106 detects off-hook transitions from the CPE 105, and initiates call release procedures towards the network in response to an off-hook transition. When a call is completed, the wireless access communication unit 106 provides landline-transparent control of disconnected procedures for clearing initiated by the CPE 105. A part of this function, the wireless access identifier comprises an international mobile subscriber identity (IMSI) number. In addition to storing the subscriber identifier, the SIM 208 also runs an authentication procedure such as for example, an "A3" and/or "A8" authentication procedure conventionally used in certain GSM application. Further details regarding authentication may be found in copending U.S. patent application Ser. No. 08/988,505 filed on Dec. 10, 1997, previously incorporated herein by reference.

In addition to the above functions, the wireless access communication unit 106 also supports the signaling of DTMF digits during an active call. As part of this function, the wireless access communication unit 106 detects DTMF tones from the CPE 105 during an active call and relays the digits to the network via DTAP signaling. Also during a call, the wireless access communication unit 106 may pass call progress tones received from the network transparently over the bearer path to the CPE 105. Whenever call progress DTAP signaling is received from the network, the wireless access communication unit 106 converts the call progress DTAP signals into call progress tones towards the CPE 105. The wireless access communication unit 106 may generate reorder tones to the CPE 105 when needed, so as to indicate congestion of the wireless network or permanent signal timer expiry conditions to the CPE 105.

Additionally, the wireless access communication unit 106 also preferably performs a number of functions related to bearer processing. For example, in a preferred embodiment the wireless access communication unit 106 performs vocoding for voice communication. In this regard, vocoding includes encoding/compression of speech towards the network and decoding/de-compression of speech in the reverse direction (i.e., towards the CPE 105). The wireless access communication unit 106 also preferably performs forward error correction (FEC), encryption and decryption for the bearer voice (with the wireless access communication unit 106 and transcoding unit 115 being peer-to-peer endpoints for ciphering), and echo cancellation functions. For encryption and decryption, the wireless access communication unit 106 encrypts the bearer data prior to transmission over the air (i.e., over the wireless trunk 108), and decrypts bearer data received from the network. Echo cancellation functions are supported by the wireless access communication unit 106 so as to suppress the echo potentially generated towards the wireless network if, for example, a 2-4 wire hybrid structure is present at the interface with the CPE 105.

In a preferred embodiment, the wireless access communication unit 106 in conjunction with the wireless system supports management and security features such as call registration, de-registration, user authentication, ciphering of bearer information, and network management functions. In addition to providing a means for outgoing voice calls, the wireless access communication unit 106 may also support outgoing emergency (i.e., "911") calls and end-to-end DTMF signaling during active calls.

Details of a preferred wireless access communication unit 201 are depicted in FIG. 2, and of a preferred software structure for the wireless access communication unit 201 in FIG. 3. As shown in FIG. 2, the wireless access communication unit 201 comprises a plurality of subscriber ports 203, which are provided for connecting the CPE 105 (see FIG. 1) to the wireless access communication unit 201 across a trunk interface (e.g., trunk interface 104 shown in FIG. 1). Each subscriber port 203 can support one call connection over the wireless access communication unit 201, and may comprise, for example, an RJ-11 interface. While four subscriber ports 203 are shown in FIG. 2, it will be understood that the number of subscriber ports 203 may vary depending upon the particular application or environment in which the wireless access communication unit 201 is deployed. For example, the wireless access communication unit 201 may be configured with only a single subscriber port 203, or may have any number of subscriber ports 203 limited only by practical considerations such as the number of wireless communication channels generally accessible and available to the wireless communication unit 201. Also, the subscriber ports 203 may comprise any suitable interface, with an RJ-11 interface being but one example of such an interface.

Each subscriber port 203 is connected to an individual line interface unit or line card section 205. Thus, the wireless access communication unit 201 comprises four line card sections 205, one for each subscriber port 203. The line card section 205 provides a physical subscriber line interface from the CPE 105 to the wireless access communication unit 201, and in addition provides digitizing and data compression functions.

Details of one of the multiple line card sections 205 are shown in FIG. 2, with the other line card sections 205 being configured in a similar fashion. The line card section 205 comprises a subscriber interface 207 which is connected to one of the subscriber ports 203. The subscriber interface 207 comprises a subscriber line interface circuit (SLIC) 217, which provides conventional loop interface functions including battery feed, overload protection, supervision, and 2-4 wire hybrid. Both loop-start and ground-start signaling are preferably supported by the line card section 205. The selection between loop-start and ground-start signaling may be made, for example, by use of a manual toggle switch or dip switch (not shown) located on the wireless access communication unit 201, each line card section 205 may be individually configured to interface with a loop-start or ground-start trunk. The subscriber interface 207 further comprises a standard CODEC or, alternatively, a subscriber line audio processing circuit (SLAC) 215 which carries out analog-to-digital and digital-to-analog conversion between the line card section 205 and the user station (e.g., telephone station 102 shown in FIG. 1) connected to the subscriber port 203. The CODEC or SLAC 215 provides a standard µ-law pulse code modulation (PCM) interface. The subscriber interface 207 also comprises a ring generator 216 for generating a ringback tone.

A digitized data stream is output from the CODEC or SLAC 215 and provided across signal line(s) 214 to a vocoder 206, which compresses the digitized data stream into a compressed data signal. The vocoder 206 comprises a relatively high-speed digital signal processor 211 (operating at, e.g., a rate of twenty million instructions per second or other suitable rate), along with support modules such as a high-speed static random-access memory (SRAM) 212 and an EPROM 213. The vocoder 206 preferably provides, as part of its decoding function, an interpolation capability for deriving predicted speech patterns, so as to handle situations where, for example, the wireless access communication unit 201 detects data frames that contain errors, or else the data frames contain errors that cannot be corrected by forward error correction (FEC). The decoding function of the vocoder 206 also preferably provides a mute capability for silencing the output to the CPE 105 when beneficial to do so, such as during control traffic exchanges. The vocoder 206 outputs a compressed data signal at a rate of, e.g., 8 Kbps, which is sent to a control line card assembly (LCA) 226 located in a control section 220. Control section 220 thereby receives four compressed data signals, one from each of the line card sections 205.

Each line card section 205 also hosts a subscriber interface module (SIM) 208. The general functions of the SIM 208 are to provide system security and store subscriber-specific information, including such things as subscriber authentication information and subscriber-specific data. In a preferred embodiment, the SIM function is duplicated for each CPE trunk supported by the wireless access communication unit 201, as each CPE trunk may be viewed as a different subscriber by the network. This duplication may be explained with reference to FIG. 6. In FIG. 6, a plurality of CPE trunks 602 are shown connected to the wireless access communication unit 605 (each CPE trunk 602 being connected to a subscriber port 203 shown in the more detailed diagram of FIG. 2). A separate SIM 606 is associated with each of the CPE trunks 602. Thus, for four CPE trunks 602, the wireless access communication unit 605 comprises four SIMs 606. The wireless access communication unit 605 further comprises a plurality of radio interface units 607, one for each of CPE trunk 602, for the purpose of passing data and other information to the wireless transceiver (not shown) which handles the physical wireless communication links 609.

Generally, each subscriber within the communication system requires unique identification and possibly different system parameters. To the extent that the multiple CPE trunks (corresponding to the multiple subscriber ports 203 shown in FIG. 2) are viewed by the system as individual and unique subscribers, each CPE trunk is associated with a unique identifier and, preferably, unique authentication and other system parameters, which are implemented at least in part with the separate SIM 208 used in each line card 205. Thus, for four CPE trunks (corresponding to the four subscriber ports 203 shown in FIG. 2), four copies of the SIM 208 are used in the wireless access communication unit 201.

The functionality of the SIM 208 may be implemented as one or more non-removable SIM chips within the wireless access communication unit hardware architecture. The SIM 208 stores within a non-volatile memory (such as a ROM, or non-volatile RAM) subscriber information such as a subscriber identifier. In a preferred embodiment, the subscriber identifier comprises an international mobile subscriber identity (IMSI) number. In addition to storing the subscriber identifier, the SIM 208 also runs an authentication procedure such as, for example, an "A3" and/or "A8" authentication procedure conventionally used in certain GSM applications. Further details regarding authentication may be found in copending U.S. patent application Ser. No. 08/988,505, previously incorporated herein by reference.

The control section 220 of the wireless access communication unit 201 provides timing and control for virtually all aspects of the wireless access communication unit 201. The control section 220 comprises a processor 225 which may comprise, for example, a 16-bit RISC processor (such as a C165 or C163 processor manufactured by Siemens Corp.) and associated support modules (i.e., SRAM, flash memory, etc.). Access to the SIM 208 is initiated by the host processor 225 and controlled and formatted by the control line card assembly (LCA) in the control section 220. The processor 225 also coordinates most system activities and moves data between the various modules.

The processor 225 is connected to the control LCA 226 which, as noted above, is connected to the vocoder 206 from each of the line card sections 205. The control LCA 226 is also connected to a radio interface line card assembly (RIF LCA) 227. The control LCA 226 provides the interface between the radio section and the line card section of the wireless access communication unit 201. The control LCA 226 packages and formats data, and coordinates and controls the over-the-air (OTA) protocol. It thereby maintains coordination between up to four compressed serial data streams (one from each of the line card sections 205) and their respective over-the-air communication channels.

The radio interface LCA 227 is connected to a baseband processor 228, which may include a digital radio ASIC (DRA) 229. The baseband processor 228 is connected to a radio section 240. The radio section 240 preferably comprises a plurality of antennas 243 which are selectable by a selector 242 which is connected to the control LCA 226. Signals from one or more antennas 243 are thereby provided to a radio transceiver 241 (possibly including multiple radio receivers, one for each antenna 243). In a preferred embodiment, antenna diversity techniques are utilized such that the wireless access communication unit 201 selects the best antenna (and/or radio receiver) for each frame of time in which it communicates. Various antenna selection techniques are known in the art, or are described in, for example, U.S. patent application Ser. No. 08/826,773 filed Apr. 7, 1997, hereby incorporated by reference as if set forth fully herein.

The wireless access communication unit 201 may be powered either through an external DC power supply 250 or an on-board battery 251. The battery 251 may be used as a reserve power supply, being brought into service automatically if the external DC supply 250 is cutoff or otherwise unavailable. A power section 221 for the wireless access communication unit 201 may comprise local voltage regulators to supply required power to the logic and radio sections, and a switching regulator to supply any requisite loop battery voltage.

The wireless access communication unit 201 may be provided with an LED 231 or other visual display mechanism(s) to indicate the status of the device to an observer. The types of status conditions to be displayed may include, for example, whether the power is on, whether the device is functional (i.e., all self tests have been passed), or whether the device is in service (i.e., is currently registered with a base station).

In operation, compressed serial data is transferred to and from the multiple line cards 205 under the direction of the control LCA 226. The control LCA 226 places the compressed serial data in a format suitable for the radio interface LCA 227. It also performs any desired encryption or adds forward error correction information. The control LCA 226 transfers the data to the radio interface LCA 227 which passes the data to the baseband processor 228. The radio interface LCA 227 keeps track of channel and timing information, and instructs the baseband processor 228 to process the data according to the channel and timing parameters. In a preferred embodiment, the baseband processor 228 comprises a transmitter for formulating continuous phase modulated spread-spectrum signals, or other types of quadrature or related signals, as described, for example, with respect to transmitters shown in. U.S. Pat. Nos. 5,629,956, 5,610,940 or 5,548,253, all of which are hereby incorporated herein by reference as if set forth fully herein. At the appropriate time intervals, as determined by the radio interface LCA 227, the baseband processor 228 sends the data to the radio section 240 which converts the signal to the appropriate transmission frequency and performs any necessary filtering for transmission over the air. The frequency band utilized by the wireless access communication unit 201 is generally dictated by the overall communication system within which the unit is deployed. For example, the frequency band may be within the PCS frequency band of 1930 MHz to 1990 MHz, or may be any other suitable frequency band or bands.

Incoming message signals are received by one or more of antennas 243 and sent to the radio transceiver 241 for downconversion and/or filtering as needed. The downconverted and/or filtered data is then sent to the baseband processor 228 which demodulates the received signal. In a preferred embodiment, the wireless access communication unit 201 transmits and receives messages using a spread spectrum format. In such an embodiment, the baseband processor 228 preferably comprises a spread spectrum correlator. A wide variety of spread spectrum correlators are known in the art, examples of which include embodiments illustrated or described in U.S. Pat. Nos. 5,629,956, 5,610,940, 5,396,515 or 5,499,265, each of which is hereby incorporated by reference as if set forth fully herein.

The baseband processor 228 outputs, among other things, a received signal strength indicator (RSSI), which is used by the control LCA 226 in selecting the best antenna 243 (and/or radio receiver) for reception of the incoming signal. After spread spectrum correlation, the baseband processor 228 provides a stream of data bits to the radio interface LCA 227, which transfers the data to the appropriate line card 205 based upon the over-the-air communication channel over which the data was received. The data is then processed by the line card 205 and sent to the CPE 105 via the particular subscriber port 203 connected to the line card 205.

A diagram of a preferred software structure for the wireless access communication unit 201 is shown in FIG. 3. As shown in FIG. 3, the software of the wireless access communication unit 201 is functionally divided into two main components, based on the physical interfaces supported by the wireless access communication unit 201. These two main components are referred to in FIG. 3 as the line manager 350 and the over-the-air manager 351.

The line manager 350 generally handles the CPE trunk management and communication between the wireless access communication unit 201 and the CPE 105. In addition to CPE trunk management and communication interface functions, the line manager 350 is also responsible for call signaling, DTMF recognition, and transfer of collected DTMF digits to the over-the-air manager 351. The line manager 350 comprises a plurality of line drivers 303 and a plurality of SIM drivers 304, one line driver 303 and one SIM driver 304 for each CPE trunk supported by the wireless access communication unit 201. A single line driver 303 and SIM driver 304 collectively comprise a CPE line software component 302.

The over-the-air manager 351 handles the communication interface and link management to the base station 109 (see FIG. 1). The over-the-air line manager 351 is also responsible for receiving DTMF digits from the CPE 105 (via the line manager 350) and relaying the DTMF digits to the base station 109 (which ultimately conveys them to the PTSN 125), as set forth in more detail copending U.S. patent application Ser. No. 08/987,893 filed on Dec. 10, 1997, previously incorporated herein by reference. The over-the-air line manager 351 also implements the over-the-air communication protocol, including end-to-end communication with various network entities such as the base station controller 112 and communication mobile switching center 116 (shown in FIG. 1). Exemplary over-the-air communication protocols that may be implemented by the over-the-air manager 351 include, for example, the GSM direct application transfer part (DTAP) protocol, or the IS-661 over-the-air ("O-Notes") protocol as described in the OMNI_Notes_RMT Protocols Rev. 02.03D (release date Mar. 30, 1997), appearing as a Technical Appendix A filed herewith, and hereby incorporated by reference as if set forth fully herein. At the physical radio level, the over-the-air manager 351 of the wireless access communication unit 201 preferably implements the IS-661 protocol as set forth in the above-referenced OMNI_Notes_RMT Protocols publication, or a variation thereof.

As further illustrated in FIG. 3, the over-the-air manager 351 comprises a plurality of CPE line link objects 310, one for each CPE trunk (i.e., subscriber port 203) supported by the wireless access communication unit 201. Each CPE line link object 310 provides the signaling resource for a single CPE line or trunk, and comprises several components which together form a signaling protocol stack. The components of the signaling protocol stack work together to interface with a CPE line to provide call management, mobility management and radio resource functionality required to complete a voice call, and the registration functionality required to utilize network resources.

Each CPE line link object 310 comprises a CPE line manager 311, the purpose of which is to interface with the CPE line software component 302 for the appropriate CPE line or trunk. In a preferred embodiment, the CPE line manager interfaces with a GSM call management component 312 and a GSM call registration component 313, both of which interface with a GSM mobility management component 314. The GSM mobility management component 314 interfaces with a protocol adaption (PAL) component 315, which interfaces with an over-the-air state (OTA) machine 316. The OTA state machine 316 is generally responsible for managing the physical radio interface, and communicates with the radio transmit/receiver interface and slot management (RTRX) component 321.

In operation, the CPE line manager 311 signals the GSM mobility management component 314 to initiate connection establishment procedures, as described in more detail in the related copending applications previously incorporated by reference herein, and as further described hereinafter with respect to the call flow diagrams appearing in FIGS. 14 through 15. The CPE line manager 311 also controls transmission of DTMF digits to the network, the enabling of the speech path, generation of ringback tones, generation of a busy tone (in non-PSTN interworking situations), and passing of on-hook indication to the CPE 105. In addition, the CPE line manager 311 manages CPE-initiated call clearing as well as normal and emergency call procedures.

The GSM call management component 312, GSM registration component 313, and GSM mobility management component 314 provide a degree of GSM functionality relating to call management, registration, and mobility management, respectively. The protocol adaption component 315 adapts, if necessary, the GSM signaling protocol to the over-the-air protocol (such as, for example, to the IS-661 over-the-air protocol). The OTA state machine 316 implements the over-the-air protocol and, as noted, manages the physical radio interface.

In addition to the multiple CPE line link objects 310, the OTA manager 351 further comprises a hardware services component 320 which provides a programming interface to the hardware (including hardware controlled by the line drivers 303 and SIM drivers 304) of the wireless access communication unit 201. The OTA manager 351 may comprise a real-time operating system (RTOS) 330, which may be a multi-tasking operating system, as well as a power-on/reset initialization (POST) component 323 and a debug port manager 322. The debug port manager 322, if provided, allows access externally to the internal status of the software, and also permits software downloads.

In addition to the above-described components, the OTA manager 351 also comprises an operations, administration and management (OAM) component 324. The OAM component runs at the application level, and performs such functions as recognition of faults, creating and sending alarms, and communicating with the line manager 350 for call processing data needed in fault detection and alarms. The types of faults or failures monitored may include, for example, hardware failures (such as power supply failures, radio unit failures, line card failures, and so on), software failures, communication failures, and quality of service failures (e.g., unsuccessful call attempts per time period, time slot interchange requests per time period, unsuccessful time slot interchanges per time period, number of dropped calls per time period, channel quality as indicated by bit error rate, and so on), among others. Fault reporting may be coordinated such that a single fault that causes multiple failures due to the dependency of the software, hardware and telecom functions will result in a single fault being reported.

In one aspect, the functionality of the over-the-air manager 351 used to support the wireless access communication unit 201 may be viewed as a subset or modification of the functionality that would be used to support a mobile user application. For example, the mobility management interface (MMI) software component used in a conventional GSM system to support a mobile user is, in the software architecture shown in FIG. 3, replaced with a CPE line manager 311. Another difference over a mobile user application is that a logical instance of the signaling protocol stack is provided for each CPE line connected to the wireless access communication unit 201 (as opposed to having a single logical instance of the signaling protocol stack for a mobile user application), and the SIM driver is modified over a mobile user application to accommodate multiple SIMs (or their logical equivalents) by, for example, the provision of multiple independent SIM drivers 304. Further, an ability is added to associate a hardware voice path from the CPE 105 with a base station communication link. The signaling protocol may also be modified, as further described herein, to support digit analysis by the base station 109 (see FIG. 1). DSAT and DTA adaptor software components conventionally used in certain mobile user applications are not needed by the wireless access communication unit 201, and are therefore not implemented.

Referring back to FIG. 1, the wireless access communication unit 106 interfaces with a base station 109 of the wireless system, thereby allowing access to the PSTN 125. A block diagram of a preferred base station 401 is shown in FIG. 4. The base station 401 comprises a number of separate components connected together by a common global bus backplane, as illustrated in FIG. 4. These components include a digital line card 404, an over-the-air (OTA) processor card 405, a power supply module 407, and a plurality of radio cards 406, all of which reside on an electronics module 420. The electronics module 420 is connected to an I/O module 421, which comprises protection circuitry 403 to prevent such things as damage from short circuits. Each radio card 406 is connected, via the protection circuitry 403, to one of a plurality of antennas 403. The digital line card 404 is connected, via protection circuitry 403, to the PSTN 125 (through base station controller 112 and MSC 116, as shown in FIG. 1) over a backhaul line 430, and possibly to other base stations 109 as well over other physical connections. The base station 401 may be connected to a local AC power supply line 425, if available.

In operation, the wireless access communication unit (identified by reference numeral 412 in FIG. 4) transmits over-the-air messages to and receives over-the-air messages from the base station 401. The multiple antennas 411 and radio cards 406 are used at the base station 401 for achieving antenna diversity. Typically one antenna 411 is selected at a given time for transmitting or receiving over-the-air signals. If spread spectrum communication is being used, then the OTA processor card 405 may comprise a spread spectrum correlator and other baseband processing circuitry for correlating a spread spectrum signal received from the wireless access communication unit 412 and converting it to data bits. The OTA processor card 405 transfers data to the digital line card 404, which formats the data and sends it over a backhaul line 430 to the PSTN 125 via the other intervening system components (such as the base station controller 112 and MSC 116). Similarly, the digital line card 404 receives data from the PSTN 125, and transfers the data to the OTA processor card 405 which formats the data for the over-the-air protocol and transmits the formatted data using a selected radio card 406 and antenna 411.

The primary functions of the radio cards 406 are to transmit and receive RF data packs, to perform packet data integrity services (e.g., cyclic redundancy checks), and to support antenna diversity algorithms. The primary function of the OTS processor card 405 is to move bearer data between the radio cards 406 and the digital line card 404. The OTA processor card 405 also executes operations, administration, management and provisioning (OAM&P) requests from the digital line card 404, communicates signaling information (using internal base station messages or "I-Notes") with the digital line card 404, and communicates signaling information (using over-the-air signaling messages or "O-Notes") with the wireless access communication unit 412. Various types of signaling information and formats therefor (including I-Notes and O-Notes) that may be transmitted across or within the base station 401 or other system components are described in, for example, copending U.S. patent application Ser. No. 08/532,466 filed Sep. 22, 1995, hereby incorporated by reference as if set forth fully herein.

The primary functions of the digital line card 404 are to handle link access procedures for the "D-channel" (LAPD) transport on the backhaul line 430, to exchange bearer data between the OTA processor card 405 and the network-side backhaul components (such as the base station controller 112), and to multiplex and demultiplex bearer data on the backhaul line 430. Other primary functions of the digital line card 404 include synchronizing the over-the-air bearer frame timing with the timing on the backhaul line 430 (such as a T1 line), to provide translation between the OAM&P procedures supported on the network and radio interfaces, to map internal base station messages (e.g., I-Notes) to/from the LAPD transport on the backhaul, and to communicate signaling information (using, e.g., signaling I-Notes) with the OTA processor card 405.

A preferred high level software architecture for the base station 401 is depicted in FIG. 5. According to the software architecture shown in FIG. 5, the software of the base station 401 is split into two functional groups, one functional group relating to the over-the-air functions and the other functional group relating to the line card functions. These two main functional groups are shown in FIG. 5 as the OTA manager 502 and the line card manager 503, each of which preferably runs on its own processor board. Communication between the OTA manager 502 and the line card manager 503 may be carried out using a dual-port RAM (not shown) physically residing on the digital line card 404.

Software for the OTA manager 502 and the line card manager 503 may be executed using different processors. For example, in a preferred embodiment, the software for the OTA manager 502 is executed using a MC68430 microprocessor, while the software for the line card manager 503 is executed using a MC68MH360 microprocessor, both of which are manufactured by Motorola Corporation. The microprocessor for the OTA manager 502 is preferably the bus master and has access to the dual-port RAM via the global bus (i.e., the backplane). IS-661 signaling messages in the form of I-Notes and bearer data are transferred across the dual port RAM interface, thereby allowing signaling communication between the OTA manager 502 and the line card manager 503.

The primary high level functions of the OTA manager 502 are to move bearer data between the dual port RAM and the radio cards 406, and to handle call control signaling between the line card manager 503 and the wireless access communication unit 412. Other functions of the OTA manager 502 include radio resource management, terrestrial resource management, and OAM&P support.

The primary high level functions of the line card manager 503 include multiplexing and demultiplexing bearer data between the dual port RAM and the backhaul line 430 (according to a protocol such as CCITT I.460, for example, if a T1 backhaul line is used), execution of LAPD transport over the backhaul line 430 (using, for example, a Q.921 interface protocol), routing and translation of signaling messages between the OTA manager 502 and the backhaul LAPD, and OAM&P support.

Various interfaces associated with the base station 401 are shown dramatically in FIG. 5 as dotted lines, and include an over-the-air interface or "O-interface" 560 between the wireless access communication unit 12 and the base station 401, an internal interface or "I-interface" 561 between the OTA manager 502 and the line card manager 503, and a network interface or "N-interface" 562 between the base station 401 and the network-side backhaul components (such as the base station controller 112, MSC 116, and PTSN 125 shown in FIG. 1). Further information regarding these interfaces may be found in copending U.S. patent application Ser. No. 08/532,466 previously incorporated herein reference, or in copending U.S. patent application Ser. Nos. 08/987,872 filed on Dec. 10, 1997 and 09/812,534 filed on Mar. 19, 2001, previously incorporated herein by reference. These interfaces are also shown at abstract level in FIG. 10, described later herein.

In operation, the base station 401 manages the radio resources for the wireless access communication unit 412, and thereby provides support for the network side of the wireless trunk 108 (see FIG. 1). A wide variety of different communication schemes and radio resource protocols may be used. If, for example, the base station 401 implements an IS-661 protocol for over-the-air communication, then the base station 401 manages the resources necessary to support the wireless communication channels between the wireless access communication unit 412 and the base station 401, including time slots and spread spectrum codes. The base station 401 also provides multiplexing functions for the transfer of data to and from the backhaul line 430 providing the connection to the PSTN 125. The base station 401 may, for example, multiplex data over a T1 (or fractional T1) backhaul line 430 to the base station controller 112, which, as noted, pipes the data to and from the PSTN 125 via the MSC 116.

Protocol signaling over the N-Interface 562, which connects the base station 401 (or 109 in FIG. 1) to the base station controller 112 (see FIG. 1), may be transported using the Q.921 LAPD protocol. Protocol signaling over the O-Interface 560, which connects the base station 401 to the wireless access communication unit 412, may be accomplished using over-the-air signaling messages ("O-Notes") according to the IS-661 protocol. The O-Notes may be transmitted along with bearer data in IS-661 RF packets.

Specific software functional components for each of the OTA manager 502 and the line card manager 503 are also depicted in FIG. 5. The OTA manager 502 comprises a signal processing component 513 and an OTA datalink component 514 which handle the transfer of bearer data for the OTA manager 502. The signal processing component 513 and OTA datalink component 514 interact with an IS-661 protocol component 512 which implements the IS-661 (or other suitable) over-the-air protocol and contains the protocol state machines for execution of the protocol on the base station 401. The signal processing component 513 and OTA datalink component 514 thereby deliver bearer data and signaling information in IS-661 packets 541. The IS-661 protocol component 512 interfaces with an OAM&P component 510 and an I-interface router component 511, and provides any necessary translation of signaling to the IS-661 protocol.

The line card manager 503 comprises a signal processing component 523 and a bearer datalink component 524 which handle the transfer of bearer data for the line card manager 503. The signal processing component 523 and the bearer datalink component 524 delivers and receives bearer data (in, e.g., an I.460 format) over a T1 backhaul link 553, which comprises one or more of the T1 time slots available on backhaul line 430. The line card manager 503 also comprises a LAPD component 522 which delivers and receives signaling messages (e.g., N-Notes) over a LAPD signaling link 551. Across the N-interface 562, therefore, two separate information "pipes" are provided, one for signaling and one for bearer traffic, whereas across the O-interface 560 the OTA manager 502 multiplexes the signaling and bearer data onto the radio channels. The LAPD component 522 interfaces with an OAM&P component 520 and an I-interface router component 521. The I-interface router component 521 of the line card manager 503 communicates with the I-interface router component 511 of the OTA manager 502, thereby allowing transfer of I-Notes between the line card manager 503 and the OTA manager 502.

The base station 401 connects and manages radio and terrestrial bearer channels for call-related features, and supports system administration via OAM&P controlled by the system operator through the operations management center 120 (see FIG. 1). As part of its radio resource management functionality, the base station 401 supports outgoing voice calls (normal and emergency) from the wireless access communication unit 412. Incoming pages to the wireless access communication unit 412 may optionally be supported by the base station 401. Because the wireless access communication unit 412 can be embodied as a stationary unit, handoff features otherwise necessary to support mobile user applications do not need to be utilized by the base station 401 to support the wireless access communication unit. However, if the base station 401 employs a protocol utilizing aspects of TDMA, the base station 401 may be configured so as to support time slot interchange (TSI) whereby traffic in time slots experiencing unacceptable levels of interference are relocated to "quieter" time slots. In an analogous fashion, the base station 401 can employ frequency interchange or code interchange, respectively, if aspects of FDMA or CDMA techniques are utilized for the over-the-air protocol.

Among its other radio resource management functions, the base station 401 manages mapping of the radio channels (including the wireless communication channels of the wireless trunk 108) to the terrestrial (i.e., backhaul) channels. The base station 401 also provides, through its OAM&P functionality, support for administrative state changes, configuration, and provisioning of the radio resources. The base station 401 also provides fault management and alarm management for the radio resources, and sends fault or alarm signals to the base station controller 112, as described in more detail hereinafter. In addition, the base station 401 provides signaling flow control across the over-the-air interface, power control management for each radio channel, radio link recovery upon radio link interruption, and debug information logs to the base station controller 112. As part of its power control management for the various radio channels, the base station 401 may send performance metrics relating to the radio resources to the base station controller 112 for analysis.

Subject to capacity and traffic constraints, the base station 401 is generally capable of handling calls from more than one wireless access communication unit 412, if multiple wireless access communication units 412 are deployed within the service area of the base station 401.

With regard to terrestrial resource management, the base station 401 manages and allocates the backhaul channels (such as T1 time slots) over the backhaul line 430. The base station 401 indicates backhaul channel allocation to the base station controller 112 through signaling messages. In those embodiments in which the wireless access communication unit 106 is non-mobile, the base station 401 need not support handoffs, and therefore need not support re-routing of backhaul channels to accommodate handoffs. The OAM&P component 520 of the base station 401 provides support for administrative state changes, configuration, and provisioning of terrestrial resources. It also provides support for performance metrics of the terrestrial resources, and sends the metrics to the base station controller 112. The OAM&P component 520 further provides fault management and alarm management for the terrestrial resources, which are also sent to the base station controller 112. The base station 401 also provides slip management and recovery for T1 backhaul connections, bearer rate adaption between the radio channels and the backhaul channels, and inband signaling within the bearer data frame to control the transcoder unit 115.

In terms of call control support, the base station 401 is involved in establishing, maintaining and tearing down outgoing voice calls received from the wireless access communication unit 412. The base station 401 also relays DTMF signaling from the end user to the PSTN 125, if necessary, during an active telephone call. This signaling is relayed transparently through the base station 401, and is supported by the I-interface and N-interface transport procedures. The base station 401 also provides digit analysis for outgoing telephone calls.

The base station 401 also preferably provides security support in various manners. The base station 401 may, for example, provide support for bearer ciphering that occurs at the transcoding unit 115 and the wireless access communication unit 106. The base station 401 may also support the GSM temporary mobile subscriber identity (TMSI) for protection of the user identity.

Referring to FIG. 1, a base station controller 112 is connected to the base station 109 over an interface such as an N-interface (such as an N-interface 562 described previously with respect to FIG. 5). Data (including signaling messages and bearer traffic) are passed between the base station 109 and the base station controller 112 across the N-interface. A preferred base station controller 112 may be viewed in one aspect as a base station subsystem controller that is used for managing one or more base stations 109. A primary responsibility of the base station controller 112 is to provide an interface between the MCS 116 and the radio access subsystem (i.e., the system components responsible for establishing and maintaining the physical radio channels). In a preferred embodiment, the base station controller 112 incorporates aspects of the IS-661 communication protocol and the GSM communication protocol, thereby using what may be referred to as a "hybrid" protocol. Details of a preferred protocol may be found in, for example, copending U.S. patent application Ser. Nos. 08/987,872 filed on Dec. 10, 1997 and 09/812,534 filed Mar. 19, 2001, previously incorporated herein by reference. In an alternative embodiments, the base station controller 112 may be implemented using the IS-661 protocol in its entirety, or the GSM communication protocol in its entirety.

According to the IS-661 protocol, management of the radio resources resides in the base station 109, with less of a role given to the base station controller 112. In a GSM-type system, on the other hand, the base station controller 112 plays a greater role in radio resource management, and may be viewed as essentially comprising a compact switch in charge of radio interface management. In the GSM system, the base station controller 112 is configured with intelligence to enable it to instruct the base station 109 and mobile stations (as well as the wireless access communication unit 106) when to allocate, handoff and release radio channels. The interface between the base station 109 and base station controller 112 in a GSM-type system is referred to as an $A_{bis}$ interface.

In a communication system using a "hybrid" protocol having aspects of both IS-661 and GSM protocols, the base station controller 112 preferably performs a variety of resource management functions. As part of these functions, the base station controller 112 switches bearer circuits and provision of bearer connectivity to form a path from the base stations 109 to the MCS 116 for outgoing voice calls from the wireless access communication unit 106. In addition to switching bearer circuits, the base station controller 112 provides signaling paths from the wireless access communication unit 106 to the MSC 116 and other network elements. If required, the base station controller 112 carries out the interworking between the BSSMAP radio resource management procedures on the GSM A-interface and the "N-Notes" radio resource management procedures on the N-interface.

The base station controller 112 is involved in the allocation and release of radio channels. If the IS-661 protocol is used, then the base station 109 is the entity that actually assigns and releases over-the-air resources. As part of call setup, however, the base station controller 112 is the entity that coordinates this process. The base station controller 112 also controls the allocation and release of backhaul channels. If the IS-661 protocol is used, then the base station 109 is the entity that actually assigns the bearer resources over the backhaul channels. However, as part of call setup, the base station controller 112 coordinates this process as well.

The base station controller 112 is also involved in ciphering of transmitted data. While the transcoding unit 115 (see FIG. 1) is preferably the network end-point for bearer ciphering, the base station controller 112 sets up and coordinates ciphering of bearer messages.

Certain mobility management procedures, such as authentication and identification, run end-to-end between the wireless access communication unit 106 and the MSC 116, and are relayed through the base station controller 112 with essentially no interworking requirements. For other mobility management functions, the base station controller 112 performs interworking between the N-interface and A-interface procedures. For example, the base station controller 112 may perform interworking between the N-interface and A-interface procedures for location updating or network-level registration (both normal and periodic, as further described herein), de-registration or IMSI detach, time slot interchange reallocation, and mobility management connection establishment.

Call control messages and procedures run end-to-end between the wireless access communication unit 106 and the MSC 116, and are relayed transparently through the base station controller 112. In one aspect, the base station controller 112 provides a signaling path between the wireless access communication unit 106 and the MSC 116 to carry out call control signaling.

The base station controller 112 may support a variety of interfaces. The base station controller 112 preferably supports the T-interface to the transcoding unit 115 or, if the transcoding unit functionality is consolidated with the base station controller 112, a GSM A-interface 571 between the consolidated base station controller/transcoding unit and the MSC 116. In the other direction, the base station controller 112 also preferably supports the N-interface 562 to the various base stations 109 to which it is connected.

In a preferred embodiment, the base station controller 112 transmits and receives information to the transcoding unit 115, shown in FIG. 1. The transcoding unit 115 in one aspect comprises a base station subsystem (BSS) entity located, in one embodiment, between the base station controller 112 and the MSC 116. Preferably, the transcoding unit 115 is under management control of the base station controller 112, but is physically located on the premises of the MSC 116, thereby allowing the base station controller 112 to be remotely located from the site of the MSC 116. The transcoding unit 115 comprises a number of transcoding unit shelves, operating independently of one another but under the control of the base station controller 112. In a preferred embodiment, each transcoding unit shelf supports up to 92 bearer channels. The transcoding unit 115 generally provides the network side processing of key functions on the bearer path. This processing may include, for example, speech transcoding, network-side forward error correction (FEC), and network-side enciphering and deciphering of bearer voice. Further details regarding the transcoding unit 115 may be found in the copending patent applications previously incorporated herein by reference.

FIG. 9 is a high level diagram illustrating a preferred breakdown of bearer path functions performed at the wireless access communication unit 106, the base station 109, and the base station controller 112 and/or transcoding unit 115. As shown in FIG. 9, the wireless access communication unit bearer path functions 901 include voice encoding and decoding 911, forward error correction (FEC) 912, encryption and decryption 913, and tone generation 914. The base station bearer path functions 902 include backhaul framing 921 and channel multiplexing and demultiplexing 922. The base station controller and transcoding unit bearer path functions 903 comprise voice encoding and decoding 931, forward error correction (FEC) 932, encryption and decryption 933, backhaul framing 934, and channel multiplexing and demultiplexing 935. These functions have been mentioned previously in relation to the various components of the system, and are further described in various levels of detail elsewhere herein or in materials incorporated by reference herein.

As shown in FIG. 9, the speech encoding/decoding, encryption/decryption and FEC functions performed in the wireless access communication unit 106 are mirrored in the based station controller 112 and/or transcoding unit 115. The channel multiplexing/de-multiplexing and backhaul framing functions performed in the base station 109 are also mirrored by the base station controller 112 and/or transcoding unit 115.

Referring again to FIG. 1, the transcoding unit 115 is connected to the mobile switching center (MSC) 116, which is connected to the PSTN 125. The MSC 116 is a cellular switch that acts as an interface between the base station subsystem (BSS) and the PSTN 125, and acts as the gateway to the long-distance network. The MSC 116 has telephone exchange capabilities including call setup, routing selection, switching between incoming and outgoing channels, control of communications, and release of connections. In addition, the MSC 116 performs its functions while taking into account mobility management aspects of the subscriber, including authentication, ciphering, radio resource management, and location register updating procedures. The MSC 116 also allows the wireless access communication unit 106 interworking to the PSTN 125. The MSC 116 may be part of a digital multiplex system (DMS) "super-node" based switching system, capable of providing the switching functions in a cellular network. Also, the visitor location register (VLR) is preferably co-located and integrated with the MSC 116. Further details regarding the MSC 116 may be found in the copending patent applications previously incorporated herein by reference.

In a mobile system, such as a PCS 1900 mobile system, the information held by the HLR component of the HLR/AuC 123 allows mobile stations to be addressed by means of a unique number, regardless of geographic location, thus allowing mobile stations to roam freely within and between networks. In a system providing fixed access wireless services in which a wireless access communication unit 106 and related components are utilized, the HLR component contains information similar to that maintained for mobile stations in a completely mobile-based system. The HLR component of the HLR/AuC 123 contains information regarding the subscribers interfacing with the wireless access communication unit 106. As noted previously, the individual CPE trunks connected to the wireless access communication unit 106 (such as CPE trunks 602 shown in FIG. 6) may appear as individual subscribers (i.e., "mobile stations") to the HLR and VLR. Hence, each CPE trunk connected to the wireless access communication unit 106 has its own (preferably unique) subscriber identity number. The subscriber identity number may, as noted previously, comprise an international mobile subscriber identity (IMSI), which is a unique, permanent identifier of a CPE trunk assigned at the time of manufacture of the CPE 105, or may comprise a mobile subscriber ISDN (MSISDN) number, which would be one of the public PSTN numbers assigned to the CPE 105.

Because the wireless network is likely to be configured to service individual mobile subscribers as well as being capable of servicing the wireless access communication unit 106, the wireless access communication unit 106 may include functionality for keeping its non-mobile aspects transparent from the wireless network. For example, a mobile telephone subscriber may occasionally signal the wireless network to refresh the VLR on a regular basis. To keep the fixed wireless aspects of the system transparent to the wireless network, the wireless access communication unit 106 may periodically perform network-level registration using, for example, a GSM periodic registration mechanism, to keep the VLR entries for the "subscribers" alive. The wireless access communication unit 106 may also perform network-level registration every time it registers through a base station 109 in a location area different from that of the base station 109 to which it was previously connected, as further described herein.

Certain features relating to voice call establishment and maintenance will now be described in more detail, with reference to the interaction among various components of a communication system in which the wireless access communication unit 106 is deployed.

For "outgoing" voice call establishment initiated by the CPE 105, the wireless access communication unit 106 handles acquisition of an over-the-air communication channel, mobility management connectivity, and call setup, and in addition is preferably capable of handling various error or exception conditions. When the wireless access communication unit 106 detects a trunk seizure by the CPE 105, the wireless access communication unit 106 marks the CPE trunk as "busy" and issues a dial tone (assuming that it is able to communicate with a base station 109). In parallel, the wireless access communication unit initiates an over-the-air communication channel acquisition procedure. The dial tone is removed when the wireless access communication unit 106 detects the first dialed digit from the CPE 105, or if it detects an on-hook from the CPE 105 prior to receiving any digits therefrom.

To facilitate initial acquisition of over-the-air communication channels, upon initial power-up the wireless access communication unit 106 preferably performs a thorough search of nearby base stations 109 to find a suitable base station 109. The wireless access communication unit 106 establishes communication with the base station 109, and receives a surrounding base station map from the current base station 109. The surrounding base station map provides the wireless access communication unit 106 with a list of neighboring base stations 109 that are candidates for over-the-air communication. Using the surrounding base station map, the wireless access communication unit 106 builds up a base station selection table containing such things as signal quality information on the neighboring base stations 109. The base station selection table is stored in non-volatile memory in the wireless access communication unit 106. On subsequent power-ons, the wireless access communication unit 106 uses the existing base station selection table to speed up its base station acquisition.

On receiving a trigger from the CPE 105 to set up an outgoing call or perform a registration, the wireless access communication unit 106 attempts to acquire an over-the-air communication channel. In certain wireless systems the acquisition of an over-the-air communication channel is accomplished by interacting with a control channel of the wireless system. In certain types of TDMA systems, the channel acquisition process may entail acquiring a time slot in a time frame established by the base station 109. Acquisition of a time slot may be carried out, for example, according to a handshake protocol described in more detail in U.S. Pat. No. 5,455,822, assigned to the assignee of the present invention, and hereby incorporated by reference as if set forth fully herein.

If the wireless access communication unit 106 is unable to find an available over-the-air communication channel for communication with the base station 109, its next action depends on whether or not there are other calls active or being set up through the wireless access communication unit 106. If there are no other calls active or being set up through the wireless access communication unit 106, then the wireless access communication unit 106 searches the surrounding area to find a base station 109 with which it can communicate. If a suitable base station 109 is found (based upon, for example, received signal quality and traffic availability), the wireless access communication unit 106 attempts to acquire an over-the-air communication channel on the new base station 109. (For example, in one particular embodiment, the wireless access communication unit 106 may look for a general polling message sent within a time slot, wherein the general polling message indicates the availability of an over-the-air time slot for communication, as generally described in the above-referenced U.S. Pat. No. 5,455,822.) If the wireless access communication unit 106 fails to acquire an over-the-air communication channel, it may try again, or else search for a different base station 109. The wireless access communication unit 106 continues with this process until it either acquires an over-the-air communication channel, or else a link establishment timeout period expires, indicating a failed attempt.

If there are other calls active or being set up through the wireless access communication unit 106 when a failed attempt to acquire another over-the-air communication channel with the current base station 109 occurs, then the wireless access communication unit 106 marks the channel acquisition attempt as failed. Alternatively, the wireless access communication unit 106 may attempt to set up the call with a different base station 109, and thereby attempt maintain communication with two different base stations 109 (the one handling the currently active calls and the one handling the newest call) simultaneously.

If the over-the-air communication channel acquisition attempt has failed, the wireless access communication unit 106 issues a "reorder" tone on the CPE trunk, and marks the over-the-air link status as congested. If the wireless access communication unit 106 has a ground-start trunk interface with the CPE 105, then the wireless access communication unit 106 busies its idle CPE trunks by seizing them (i.e., applying tip to ground on each CPE trunk 602). So long as the congested condition is in effect, the CPE 105 attempts to route the calls that would otherwise be directed to the wireless access communication unit 106 to the PSTN 125 (assuming that the CPE 105 has call routing capability). While in the "congested" state, the wireless access communication unit 106 continues to track the over-the air channel availability on the current base station 109. Should the congested condition clear (e.g., it is able to see general polling messages from the base station 109, or otherwise receive information from the base station 109 indicating available communication channels), the wireless access communication unit 106 then marks the over-the-air link status as "uncongested." If the wireless access communication unit 106 has a ground-start trunk interface with the CPE 105, then the wireless access communication unit 106 un-busies any CPE trunks by releasing them (i.e., removing tip from ground).

If acquisition of an over-the-air communication channel is successful, then the wireless access communication unit 106 proceeds with digit transmission and analysis. On detecting the first dialed digit, the wireless access communication unit 106 removes the dial tone and initiates a digit analysis procedure. In a preferred embodiment, digits are relayed from the wireless access communication unit 106 as they are received after the over-the-air communication channel has been established, and digit analysis is performed at the base station 109. The base station 109 stores the digits and analyzes them, determining the type of call and the end of the dialing sequence.

In an illustrative embodiment, the base station 109 analyzes the digits as follows. If the base station 109 detects the digit pattern "X11," where "X" is a "4" or a "9", it will consider dialing to be complete. If the digit sequence is "911," the base station 109 marks the call type as an emergency call. Any other type of call is marked as a normal call. If the first three digits are not "411" or "911," then the base station 109 continues to receive digits, and uses a dialing-complete timeout period (of, e.g., four seconds) to detect the end of dialing. To implement the dialing-complete timeout period, a dialing timer is activated when the first digit is received by the base station 109, and is reset each time a new digit is received. When the dialing timer expires, the base station 109 considers dialing to be complete.

On determining that the dialing sequence is complete, the base station 109 issues a trigger to the wireless access communication unit 106 to continue with call establishment, including mobility management connection establishment and call setup. This trigger also indicates the type of call (i.e., normal versus emergency).

Several types of exceptions or errors may occur in the attempt to establish a communication path from the user (i.e., telephone station 102) to the base station 109. For example, if the wireless access communication unit 106 is unable to communicate with the base station 109, then the wireless access communication unit 106 will not generate a dial tone. Instead, it will issue a reorder tone to the user via the CPE 105. If no digit is received by the wireless access communication unit for a predetermined timeout period (e.g., 16 seconds) after the trunk seizure is recognized by the wireless access communication unit 106, then it applies permanent signal treatment on the trunk (i.e., treats it as an extended off-hook situation), as further described below. If the dialing from the user is incomplete, or if the dialed number is invalid, then the MSC 116 takes appropriate action. In such situations, the base station 109 generally detects end-of-dialing and triggers the wireless access communication unit 106 to set up the call. The incomplete or invalid digit sequence is then filled into a DTAP Setup message by the base station 109 and sent to the MSC 116. The digit analysis performed at the MSC 116 detects the exception condition, causing the MSC 116 to return a DTAP Release Complete message to the wireless access communication unit 106, indicating that the dialed number is invalid.

If the wireless access communication unit 106 should lose communication with its current base station 109, or if the quality of one or more over-the-air communication links has dropped below an acceptable minimum (based on, e.g., high bit error rate, low signal strength, and the like), the wireless access communication unit 106 starts a base station acquisition procedure to locate a base station 109 that it can communicate with satisfactorily. For a ground-start trunk interface between the wireless access communication unit 106 and the CPE 105, the wireless access communication unit 106 "busies" its CPE trunks by seizing them—i.e., by applying tip to ground on each trunk. On completing base station re-acquisition (either by re-establishing communication with the current base station 109 or finding a strong enough RF link with a different base station), the wireless access communication unit 106 un-busies each of the CPE trunks that were busied out when communication with the base station 109 was lost or interrupted.

In another aspect of the invention, each CPE trunk supported by the wireless access communication unit 106 represents a logical subscriber to the network, even though the multiple CPE trunks are physically connected to the wireless access communication unit 106. Thus, for example, where four CPE trunks 602 are connected to the wireless access communication unit 106, four unique subscriber identifiers are allocated. The use of different logical subscriber identifiers for each CPE trunk 602 permits multiple calls to be handled by the wireless access communication unit 106 across one or more wireless links to the base station 109. In a particular embodiment, each CPE trunk 602 is identified with its own unique international mobile subscriber identity (IMSI) number and mobile station ISDN (MSISDN) number for addressing. When the wireless access communication unit 106 initiates "mobility management" and call control procedures on behalf of one of the connected CPE trunks, it uses the IMSI assigned to that CPE trunk.

To the network side of the system (i.e., the base station 109, base station controller 112, MSC 116, etc.), each logical subscriber associated with the wireless access communication unit 106 is seen as a separate user, much like the separate mobile subscribers that can also communicate wirelessly with the base station 109. The base station 109 generally need not know that a group of different IMSIs belongs to a single entity (i.e., the wireless access communication unit 106). The IMSIs are preferably held on one or more subscriber interface module (SIM) chips, programmed at the factory. Each SIM chip, once placed in the wireless access communication unit 106, belongs to a specific CPE trunk. The IMSI is used, as described elsewhere herein, for such things as registration, authentication, and network access.

For each IMSI stored in the wireless access communication unit 106 there preferably is a corresponding MSISDN stored in the HLR component of the HLR/AuC 123. The MSISDN number may be the equivalent of the NANP number converted into an MSISDN number—i.e., a number in the format of 1+NPA+NXX+XXXX. The MSISDN number is used for such things as call origination and billing generation. The MSISDN number may be one of the public PSTN numbers assigned to the CPE 105; therefore, the MSISDN number may be assigned to the CPE 105 from the PSTN 125.

The wireless access communication unit 106 may be assigned an identifying serial number in the form of an International Mobile Equipment Identity (IMEI) number. The IMEI number may be assigned at the factory, and each wireless access communication unit 106 is preferably associated with a unique IMEI number. If an Equipment Identity Register (EIR) element is used within the network, it will contain the IMEI number of each wireless access communication unit 106 in the system. Alarms generated by the wireless access communication unit 106 may use the IMEI number for identification purposes.

The invention provides in another aspect signaling techniques and protocols for facilitating communication in a system having a wireless trunk. Signaling information is transported across one or more of the various interfaces of the communication system 101, so as to allow communication between the CPE 105 and the PSTN 125 to take place utilizing the capabilities of the wireless access communication unit 106. In a preferred embodiment, the communication system 801 incorporates aspects of the IS-661 communication protocol (or a modified version of the IS-661 protocol) and the GSM communication protocol, thereby employing a "hybrid" protocol.

FIG. 10 is a diagram showing interfaces between different components of a communication system 801 according to a preferred embodiment of the present invention. Some of these interfaces have been generally described previously with respect to the preferred base station 501 shown in FIG. 5. The different interfaces shown in FIG. 10 include an over-the-air interface or "O-interface" 560 between a wireless access communication unit 106 and the base station 109, an internal interface or "I-interface" 561 internal to the base station 109 (i.e., between the OTA manager 502 and the line card manager 503 of the preferred base station 501, as shown in FIG. 5), and a network interface or "N-interface" 562 between the base station 109 and the base station controller 112. The base station controller 112 communicates with the MSC 116 over a standard interface such as the GSM A-interface 571.

In a preferred embodiment, in accordance with the embodiment of the invention shown in FIG. 1, a transcoding unit 115 is interposed between the base station controller 112 and the MSC 116. In this embodiment, an additional interface designated the "T-interface" is provided between the base station controller 112 and the transcoding unit 115, and the transcoding unit 115 communicates with the MSC 116 over a standard interface such as the GSM A-interface 571.

The communication interfaces shown in FIG. 10 are described in detail in the related copending applications previously incorporated herein by reference—e.g., U.S. patent application Ser. Nos. 08/987,872 filed on Dec. 10, 1997 and 09/812,534 filed on Mar. 19, 2001. Certain details of the various interfaces are also described below.

The "O-interface" 560 between the wireless access communication unit 106 and the base station comprises one or more wireless, over-the-air communication channels, each channel preferably (but not necessarily) including a forward communication link and a reverse communication link to support full duplex communication. The over-the-air communication channel(s) of the O-interface 560 may be implemented according to any of a variety of different multiple-access communication protocols, including protocols utilizing time division multiple access (TDMA), frequency division multiple access (FDMA), or code division multiple access (CDMA), or various combinations thereof.

Figure 16:
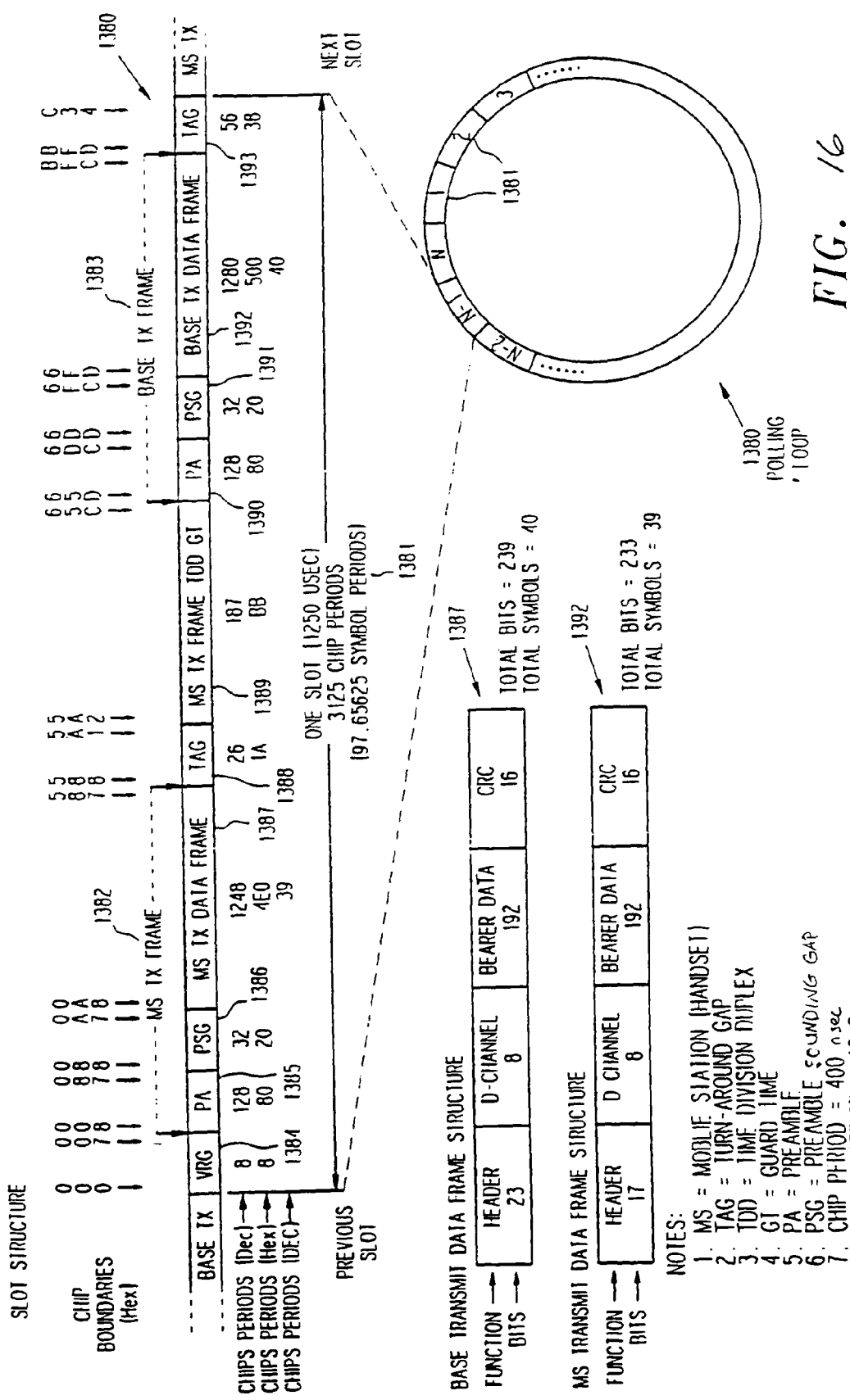
FIG. 16 is a timing diagram of an over-the-air protocol that may be used in the communication system shown in FIG. 1.

One possible communication protocol that may be used for communicating across the O-interface 560 in one embodiment of the present invention is depicted in FIG. 16. The protocol depicted in FIG. 16 makes use of time division multiple access (TDMA) and spread spectrum techniques. As shown in FIG. 16, a polling loop 1380 ("major frame") comprises a plurality of time slots 1381 ("minor frames"). Each minor frame 1381 comprises communication between a base station 109 (e.g., cellular station) and a user station (e.g., mobile user) in time division duplex—that is, the base station 109 transmits to a user station and the user station transmits back to the base station 109 within the same minor frame 1381.

Figure 17:
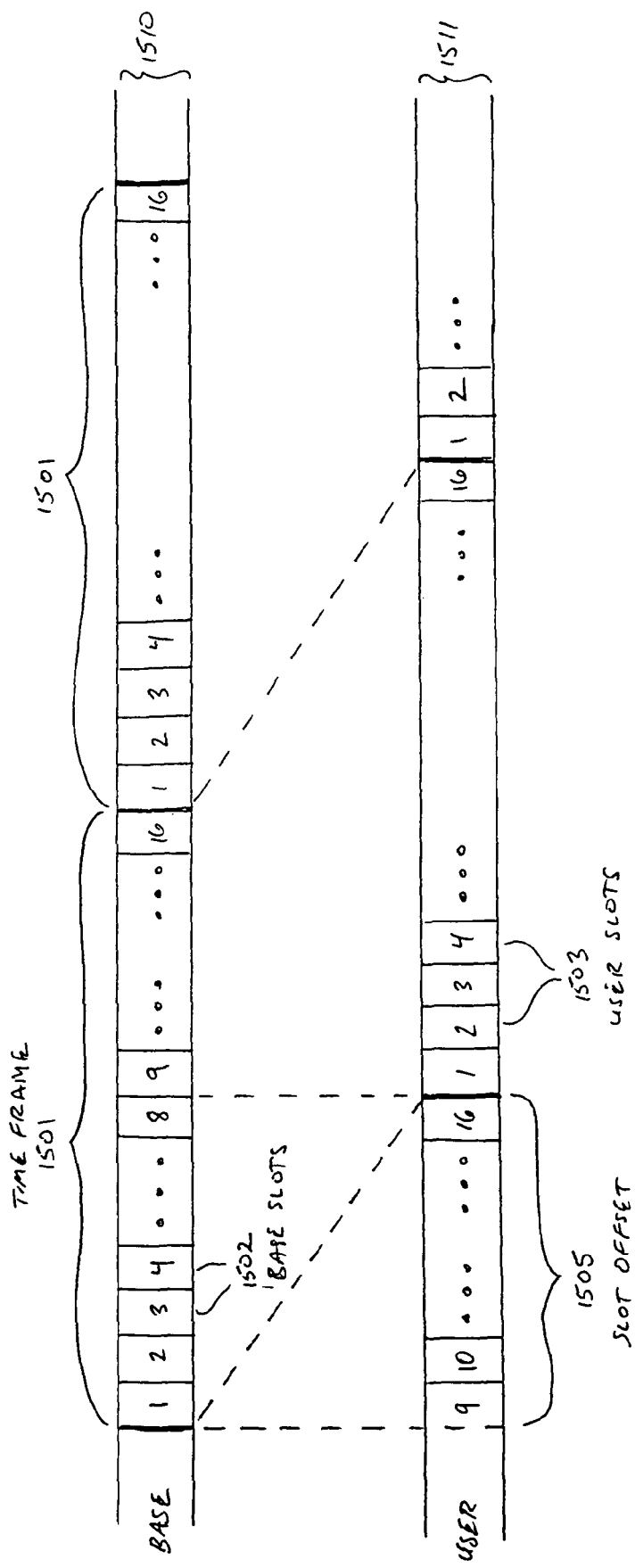
FIG. 17 is a timing diagram of an alternative over-the-air protocol for the communication system shown in FIG. 1.

Another communication protocol that may be used for communication across the O-interface 560 is depicted in FIG. 17. The protocol depicted in FIG. 17 uses aspects of both FDMA (in the sense that transmissions are distinguished by different frequency allocations) and TDMA (in the sense that transmissions are distinguished by separate time allocations). As shown in FIG. 17, one frequency band 1510 is allocated to a base station 109 for base-to-user transmissions, and another frequency band 1511 is allocated to user stations (e.g., handsets, or other wireless units) for user-to-base transmissions. A repeating major time frame (or "polling loop") 1501 is defined for communication over each frequency band 1510, 1511. A plurality (e.g., sixteen) of base time slots 1502 and user time slots 1503 are defined within the repeating major time frame 1501, with the user time slots 1503 preferably lagging behind the base time slots 1502 by an amount of time. In a preferred embodiment, in which sixteen base time slots 1502 and sixteen user time slots 1503 are defined in each major time frame 1501, the time lag 1505 between the first base time slot 1502 and first user time slot 1503 is a preset amount of time corresponding to a number of time slots, such as eight time slots, and is therefore referred to as a "slot offset." This time lag or slot offset 1505 allows user stations time to receive transmissions over the base frequency band 1510 in the assigned base time slot 1502, process the base-to-user transmissions, perform a transmit/receive frequency switch, and transmit a reverse link transmission in the corresponding user time slot 1503, without having to wait an entire time frame duration to transmit a reverse link transmission. The slot offset 1505 can comprise an amount of time other than eight time slots, or the major time frame 1501 can be defined such that there is no slot offset 1505 at all.

In one aspect of a preferred communication protocol, a single base time slot 1502 and a single user time slot 1503 collectively comprise a duplex communication channel. In a preferred embodiment, the time frame 1501 of the protocol described with reference to FIG. 26 supports sixteen base time slots 1502 and sixteen corresponding user time slots 1503, for a total of sixteen possible duplex communication channels. In a preferred embodiment, each base time slot 1502 and user time slot 1503 is 1.35 milliseconds in duration, and each time slot permits 9.6 kilobits/second for the transmission of encoded speech or other data.

Communication channels are preferably assigned to the wireless access communication unit 106 on a demand basis, although they may, in certain embodiments, be pre-allocated as well. An advantage of dynamic assignment of over-the-air communication channels is that more users can be supported. For the protocol shown in FIG. 26, over-the-air communication channels are preferably assigned based on requests from the wireless access communication unit 106 to the base station 109. The assignment of over-the-air communication channels is carried out in the same fashion for mobile users (if any) that also communicate with the base station 109—i.e., according to the cellular communication protocol for the network of which the base station 109 is a part. For example, over-the-air communication channels may be assigned with the assistance of a dedicated control channel. Over-the-air communication channels may also be assigned according to techniques similar to those described in, for example, U.S. patent application Ser. No. 08/463,220 filed on Jun. 5, 1995, hereby incorporated by reference as if set forth fully herein. Any other suitable mechanism for allocating or assigning over-the-air communication channels may also be used.

Details of a preferred I-interface 561 may be found in, e.g., U.S. patent application Ser. No. 08/610,193 filed on Mar. 4, 1996, hereby incorporated by reference as if set forth fully herein. Further details of the I-interface 561 are also discussed herein with respect to FIG. 5.

The N-interface 562, which connects the base station 109 to the base station controller 112, comprises both traffic and signaling communication channels. At the physical layer, the N-interface 562 uses a fractional T1 service as the transport mechanism. Each fractional T1 link supports transfer rates from 64 kilobits/second up to 1.536 megabits/second. Each time slot on the T1 link supports up to four 16 kilobit/second bearer channels. FIG. 7 shows in more detail the interface signaling structures for the N-interface 562 used in conjunction with a preferred embodiment of the invention. As shown in FIG. 7, a base station controller (BSC) 702 is connected to a base station (OBTS) 703 over a plurality of logical links 711 through 715, all of which are, from a physical standpoint, multiplexed onto a single digital timeslot channel (or DS0) and transmitted using pulse code modulation (PCM). The base station 703 shown in FIG. 7 comprises two transceivers 706, 707 (designated "TRX1" and TRX2," respectively), which are identified by terminal endpoint identifiers TEI B and TEI C, respectively, and a base common function (BCF) 705, which is identified by terminal endpoint identifier TEI A.

Signaling messages for traffic control are transmitted on two of the logical links 713 and 715, one of each connected to transceivers 706 and 707. Signaling messages carried by logical links 713 and 715 for interactions between the base station 703 and base station controller 702 relate to functions such as, for example, backhaul and radio resource management, and mobility management. Signaling messages carried by channels 713 and 715 also relate to end-to-end call control and mobility management signaling between the wireless access communication unit 106 and the MSC 116, and are encapsulated within transport notes. In addition, observation counters and operation measurements sent by the base station 703 to the base station controller 702, and encapsulated within transport notes, can be conveyed across logical links 713 and 715.

Messaging related to management functions (such as OAM&P) is carried on logical links 711, 712 and 714, to the base common function 705 and transceivers 706 and 707, respectively. The OAM&P messaging provides for management of the base station 703 by the base station controller 703.

In a preferred embodiment, the base station controller 112 is connected to a transcoding unit 115 over a T-interface, which is shown in FIG. 1 but not explicitly shown in FIG. 10. The T-interface links the base station controller 112 to the transcoding unit 115 over a T1 connection, which carries a variety of different links, including bearer voice channel links and signaling links. The transcoding unit 115 (if provided) is connected to the MSC 116 over a standard interface, such as the GSM A-interface 571. Alternatively, the functionality of the transcoding unit 115 may be incorporated in the base station controller 112, which then would connect to the MSC 116 over a standard interface such as the GSM A-interface. The A-interface is depicted in FIG. 1, and is also denoted in FIG. 7 by reference numeral 571. Details of the GSM A-interface are described in, for example, "Mobile Switching Center (MSC) to Base Station Subsystem (BSS) Interface; Layer 3 Specification," GSM Recommendation 08.08. Preferably, some modifications are made to the standard GSM A-interface to support the features and functionality of the preferred embodiment or embodiments described herein. Such modifications may include, for example, using a T1 line as the physical interface to carry both traffic and signaling, and using μ-law coding in certain geographical regions (such as North America).

Signaling links for the A-interface, in general, logically run between the base station controller 112 and the MSC 116, whereas the bearer links span between the transcoding unit 115 and the MSC 116. The transcoding unit 115, as noted, processes the 16 kilobits/second bearer links received over the T-interface, and generates 64 kilobits/second pulse-code modulation links towards the MSC 116. The A-interface signaling channels carry signaling connection control part (SCCP) logical signaling links. An SCCP link is maintained between the base station controller 112 and the MSC 116 for each active CPE trunk (or "logical mobile station") of the wireless access communication unit 106 that is communicating with the PSTN 125. Signaling information carried over the A-interface includes SS7 signaling between the base station controller 112 and the MSC 116 for management of the link, A-interface radio resource management signaling, A-interface mobility management signaling, call control signaling between the wireless access communication unit 106 and the MSC 116 relayed through the base station controller 112, and, optionally, OAM&P signaling between the base station controller 112 and the OMC 120. The A-interface signaling traffic passes through the transcoding unit 115 (if provided), and the transcoding unit 115, as noted, relays the signaling information transparently between the base station controller 112 and the MSC 116.

As noted previously herein, both GSM and non-GSM aspects of signaling are utilized in a preferred communication system 101 in accordance with the present invention. In a preferred embodiment, aspects of GSM signaling and messaging are used within the communication system 101 such that the interworkings of the physical protocol are essentially transparent at the network level. In this embodiment, a non-GSM physical layer is employed, while communication with the MSC is packaged using a GSM signaling format so that the non-GSM aspects of the wireless system are transparent to the network.

FIG. 8 is a diagram showing a protocol architecture for one particular embodiment of the preferred communication system 101, and further depicts a preferred relationship of connections among the wireless access communication unit 106, base station 109, base station controller 112, and MSC 116 across the O-interface 560, N-interface 562 and A-interface 571. In the protocol architecture shown in FIG. 8, "CM" relates to connection management, "MM" relates to mobility management, "OTA" relates to the over-the-air protocol, "LAPD" relates to link access protocol for the D channel, "IWF" relates to an interworking function, "Ph L" relates to the physical layer, "BSSMAP" relates to the base station subsystem management application part, "SCCP" relates to SS7 signaling connection control part, "MTP" relates to message transfer part (MTP Layers 2 and 3), "OAM" relates to operations, maintenance and administration, "NTS-MM" relates to N-Notes mobility management, and "NTS-RR" relates to N-Notes radio resource management.

For most of the physical radio functions, a preferred embodiment of the communication system utilizes the protocol architecture for the IS-661 mobility system. For higher level functionality, a preferred embodiment of the communication system uses aspects of GSM, as described in more detail hereinafter.

The wireless access communication unit 106 preferably supports two basic types of registration: network-level and base-level. For both network-level registration and base-level registration, the wireless access communication unit 106 performs registration of two different varieties, referred to herein as "normal" registration and "periodic" registration. Thus, in this particular embodiment of the invention, four types of registration are preferably supported.

The two types of network-level registration supported by the wireless access communication unit 106 in this embodiment include normal network-level registration and network-periodic registration. Since each CPE trunk connected to the wireless access communication unit 106 is looked upon by the network as an individual subscriber, the registration procedure is preferably carried out by the wireless access communication unit 106 on behalf of an individual CPE trunk. Each CPE trunk is separately registered according to its unique identifier (i.e., its IMSI). If the registration fails for a particular CPE trunk, the wireless access communication unit 106 marks the CPE trunk (or IMSI) as having failed registration.

Normal network-level registration is carried out when the wireless access communication unit 106 is powered up, or when the wireless access communication unit changes location area—i.e., it starts communicating with a base station 109 that belongs to a location area different from the one in which it was previously registered. The registration procedure may comprise a normal location updating procedure on the A-interface 571.

FIG. 18 is a call flow diagram illustrating normal network-level registration. As shown in FIG. 18, upon power-up the wireless access communication unit 106 establishes a wireless communication channel (e.g., an over-the-air time slot in a TDMA system, such as described previously with respect to FIG. 16 or 17). After acquiring the wireless communication channel, the wireless access communication unit 106 transmits a service request to the base station 109 specifying that a logical link is requested for the transmission of operations and maintenance data concerning the wireless access communication unit 106. The service request may take the form of a Control Traffic Service Request (CT-SRQ) message. The base station 109 responds with a control traffic acknowledgment message. The wireless access communication unit 106 then transmits one or more control traffic transport messages to the base station 109 including information regarding the subscriber identifiers (i.e., IMSIs) of the CPE trunks and the equipment identifier (i.e., the IMEI) of the wireless access communication unit 106. In response, the base station 109 enters the mapping between the IMEI and the IMSIs into its equipment/subscriber table (also referred to herein as its "IMEI table"). The base station 109 then formats an "alarm" message and sends an alarm to the OSS 122 with information identifying the wireless access communication unit 106 (i.e., its IMEI) and a message that the wireless access communication unit 106 has registered. After transmitting registration information, the wireless access communication unit 106 releases the logical link by transmitting a Control Traffic Release (CT-REL) message to the base station 109, as shown in FIG. 18.

In addition to network-level registration, the wireless access communication unit 106 also may perform periodic network-level registration. To do so, the wireless access communication unit 106, after initial registration, periodically re-registers each IMSI (i.e., each CPE trunk), with a periodicity selected so that the duration between registrations is less than a prescribed time. For example, the prescribed time may be an amount of time that is less than the record retention time of the visitor location register (VLR) at the MSC 116. The prescribed time should also be selected as long enough so as not to be burdensome to the wireless network. The periodic network-level registration translates to a periodic location updating procedure on the A-interface 571. The periodicity is configurable in the GSM network infrastructure.

As part of the initialization procedure after power-up, and preferably periodically thereafter, the wireless access communication unit 106 registers with a nearby base station 109 and also with the PSTN 125. In this context, registration may generally be described as the process by which a subscriber (i.e., a CPE trunk 602) connected to the wireless access communication unit 106 identifies itself to the network. Since each CPE trunk connected to the wireless access communication unit 106 is looked upon by the network as an individual subscriber, the registration procedure is typically carried out on behalf of an individual CPE trunk, and may need to be repeated for multiple CPE trunks.

FIG. 12 is a call flow diagram illustrating a network-level registration procedure. As a first step in the procedure illustrated in FIG. 12, the wireless access communication unit 106 acquires a wireless communication channel (e.g., a time slot in a TDMA or TDD system, or a frequency channel in an FDD system, or other defined channel) to a nearby base station 109. The wireless communication channel is acquired according to the particular protocol utilized by the wireless system. The wireless access communication unit 106 then performs a network-level registration procedure, according to the particular registration protocol utilized by the system. The registration procedure may involve, for example, a location updating procedure on the A-interface. The wireless access communication unit 106 performs network-level registration at regular intervals thereafter, with periodicity controlled by the network infrastructure. The wireless access communication unit 106 may also perform network-level registration if it starts communicating through a base station 109 in a different location area from the base station with which it had been previously communicating. After registration, the wireless communication channel is surrendered, and the MSC 116 initiates a resource release procedure, as illustrated in FIG. 12.

The wireless access communication unit 106 preferably also supports two types of base-level registration: normal registration and base-periodic registration. For base-level registration, each CPE trunk is separately registered according to its unique identifier (i.e., IMSI).

Normal base-level registration is carried out when the wireless access communication unit 106 starts communicating with a base station 109 that is different from, but belongs to the same location area, as the one with which it was previously registered. Normal base-level registration allows the wireless access communication unit 106 to receive a new Surrounding Base Table, without having to change location areas. The base-level registration procedure translates to a normal location updating procedure on the A-interface.

In addition to normal base-level registration, the wireless access communication unit 106 may also perform periodic registration with the base station 109 at regular intervals, with a periodicity controlled by the base station 109 and/or configurable through OAM&P. For each registration attempt, the wireless access communication unit 106 acquires a wireless communication channel, registers, and then surrenders the wireless communication channel, unless a call is in progress. If a call is in progress, the wireless communication unit 106 need not acquire a new channel, but can, if possible under the particular wireless protocol, send registration information over the existing communication channel. In addition to periodic base-level registration, the wireless access communication unit 106 also performs initial registration with a base station 109 when it starts communicating through a base station different from but in the same location area as a base station with which it was previously communicating.

The base-periodic registration period can be used as a mechanism for monitoring the "health" of the wireless access communication unit 106. In this aspect, the base-periodic registration may serve as a "heart-beat" for the base station 109 to know that the wireless access communication unit 109 is still in communication with it.

De-registration is performed by the system on behalf of each CPE trunk connected to the wireless access communication unit 106 when the wireless access communication unit 106 is powered off. FIG. 13 is a call flow diagram illustrating a network level de-registration procedure. As a first step in the procedure illustrated in FIG. 13, the wireless access communication unit 106 acquires a wireless communication channel (e.g., a TDMA time slot) to a nearby base station 109. The wireless communication channel is acquired according to the particular RF protocol utilized by the wireless system. The wireless access communication unit 106 then performs a network-level de-registration procedure, such as an IMSI detach procedure, according to the particular protocol utilized by the system. After de-registration, the wireless communication channel is surrendered, and the MSC 116 initiates a resource release procedure, as illustrated in FIG. 13.

After registration by the wireless access communication unit 106, outgoing calls may be placed to the PSTN 125 via the CPE 105, wireless access communication unit 106 and base station subsystem. Such actions may include provision of dial tone, digit transmission, digit analysis and call setup for outgoing calls under various types of CPE embodiments, including PBXs and KTSs with different levels of routing intelligence.

Call setup in accordance with various embodiments of the invention may be described with reference as appropriate to the call flow diagrams depicted in FIGS. 14 and 15. FIG. 14 illustrates a call flow for successful CPE-originated normal (i.e., non-emergency) call setup sequence, with non-PTSN interworking at the MSC 116. As depicted in FIG. 14, provision of the dial tone, transmission of digits and digit analysis is carried out. Further details regarding these procedures are found in copending U.S. patent application Ser. Nos. 08/988, 546 filed on Dec. 10, 1997, 08/987,872 filed on Dec. 10, 1997 and 09/812,534 filed on Mar. 19, 2001, each of which has been previously incorporated herein by reference. In each instance the call flow terminates with an end of dialing indication from the base station 109 to the wireless access communication unit 106. Upon receiving the end of dialing indication from the base station 109, the wireless access communication unit 106 initiates a mobility management connection establishment procedure for a normal call. This procedure results in an SCCP link being established for the call across the A-interface (assuming a GSM system and further results in a mobility management connection being set up with the MSC 116 for handling the call. Part of this procedure may, if desired entail authentication and cipher mode setting procedures for the call.

After completion of the mobility management connection procedure, the wireless access communication unit 106 sends a direct transfer application part (DTAP) Setup message to the base station 109, as illustrated in FIG. 14. The DTAP Setup message contains an empty called party address field, and is directed towards the MSC 116. The base station 109 intercepts the DTAP Setup message and fills in the called address field with the digits received from the wireless access communication unit earlier during the digit analysis step. The base station 109 then forwards the DTAP Setup message, via the base station controller 112, to the MSC 116. The MSC 116 acknowledges the receipt of the DTAP Setup message by sending a DTAP Call Proceeding message to the wireless access communication unit 106, as illustrated in FIG. 14.

A bearer resource assignment procedure is then executed on each interface of the wireless fixed-access system, starting from the A-interface 571 and progressing to the O-interface 560. The bearer resource assignment procedure results in bearer channels being assigned on the A-interface 571, N-interface 562 and O-interface 560, and a switched connection being set up through the base station controller 112.

After the bearer resource assignment procedure is complete, the MSC 116 sends a DTAP Alerting message to the wireless access communication unit 106. The wireless access communication unit 106 provides a ringback tone to the user 102, via the inband path through the CPE 105 (i.e., the PBX or KTS, or other similar system). When the called party answers the call, the MSC 116 sends a DTAP Connect message to the wireless access communication unit 106. At that point the wireless access communication unit 106 attaches its speech path and removes the ringback tone to the user 102. The wireless access communication unit 106 responds to the MSC 116 with a DTAP Connect Acknowledgment message, and the call is then in a conversation state.

Figure 15:
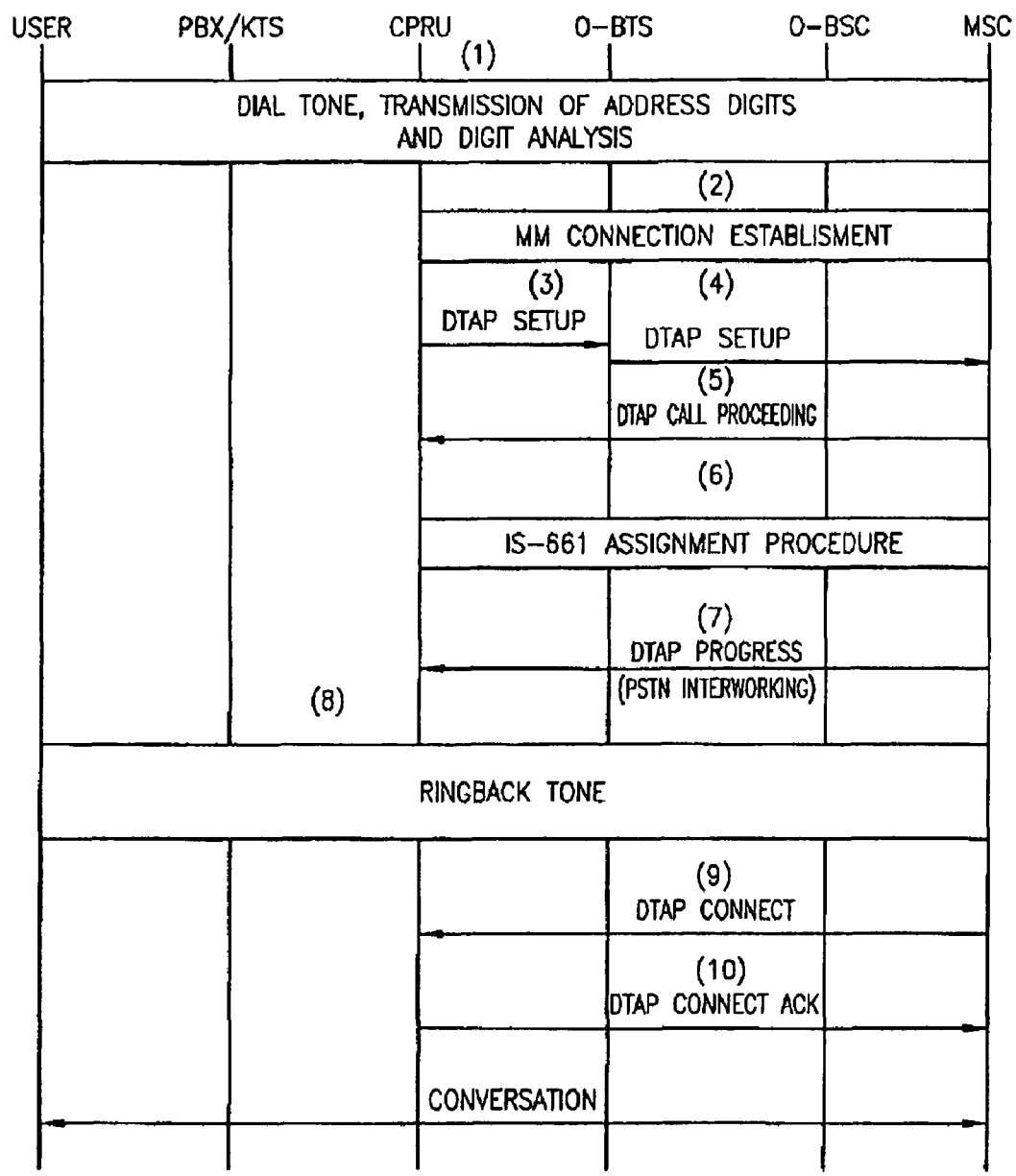
FIG. 15 is a call flow diagram for a successful outgoing call setup with PSTN interworking.

FIG. 15, like FIG. 14, illustrates a call flow for a successful CPE-originated normal call setup sequence, but with PSTN interworking at the MSC 116. As depicted in FIG. 15, provision of the dial tone, transmission of digits and digit analysis is carried out, similar to the manner described for the call flow of FIG. 14. Upon receiving an end of dialing indication from the base station 109, the wireless access communication unit 106 initiates a mobility management connection establishment procedure for a normal call. Similar to the call flow of FIG. 14, this procedure results in an SCCP link being established for the call across the A-interface (assuming a GSM system), and further results in a mobility management connection being set up with the MSC 116 for handling the call. Part of this procedure may, if desired, entail authentication and cipher mode setting procedures for the call.

After completion of the mobility management connection procedure, the wireless access communication unit 106 sends a DTAP Setup message to the base station 109. The DTAP Setup message contains an empty called party address field, and is directed towards the MSC 116. The base station 109 intercepts the DTAP Setup message and fills in the called address field with the digits received from the wireless access communication unit earlier during the digit analysis step. The base station 109 then forwards the DTAP Setup message, via the base station controller 112, to the MSC 116. The MSC 116 acknowledges the receipt of the DTAP Setup message by sending a DTAP Call Proceeding message to the wireless access communication unit 106, as illustrated in FIG. 15. A bearer resource assignment procedure is then executed on each interface of the wireless fixed-access system, starting from the A-interface and progressing to the O-interface, similar to the call flow of FIG. 14. The bearer resource assignment procedure results in bearer channels being assigned on the A-interface, N-interface and O-interface, and a switched connection being set up through the base station controller 112.

After the bearer resource assignment procedure is complete, the MSC 116 sends a DTAP Progress message to the wireless access communication unit 106, indicating interworking with the PSTN 125. The wireless access communication unit 106 attaches its speech path at this point. The network senses the ringback tone over the connected speech path, and the ringback tone is relayed by the wireless access communication unit 106 to the user 102, via the CPE 105 (i.e., the KTS or PBX, or other similar system). When the called party answers the call, the network removes the ringback tone. The MSC 116 sends a DTAP Connect message to the wireless access communication unit 106. The wireless access communication unit 106 responds with a DTAP Connect Acknowledgment message, and the call then moves to a conversation state.

In either call flow scenario depicted in FIG. 14 or 15, if the called party is busy, the call will generally be rejected. In the case of non-PSTN interworking, a busy tone is sent from the wireless access communication unit 106 to the user 102 in response to a DTAP Disconnect message from the MSC 116, and a DTAP release procedure is initiated. When an on-hook signal is detected from the user 102, the wireless access communication unit 106 initiates a call resource release procedure. In the case of PSTN-interworking, the busy tone is sent from the PSTN 125. When the CPE 105 detects an on-hook signal from the user 102, it sends a disconnect message to the wireless access communication unit 106, which then initiates a DTAP release procedure followed by a call resource release procedure.

In the case of ISDN interworking on the long-distance network interface, the wireless access communication unit 106 generates the appropriate call progress tones to the CPE 105 based on DTAP signaling received from the MSC 116. Such call progress tones include busy tones and ringback tones, for example. In case of PSTN interworking, these call progress tones are generated by the PSTN 125 and passed inband to the wireless access communication unit 106, which relays them to the CPE 105. The dial tone is always generated by the wireless access communication unit 106. Also, a reorder tone may be generated by the wireless access communication unit 106 during congestion conditions or as part of permanent treatment.

Both normal and emergency calls can be handled by the preferred communication system of FIG. 1. Emergency calls (i.e., "911" calls) are preferably routed by the CPE 105 directly to the PSTN 125. This may be accomplished in the same manner other calls are routed. For example, the user may dial a PSTN access code for an emergency call (in the case of a PBX), or may select a PSTN trunk from the desksets (in the case of a KTS). Alternatively, the CPE 105 can be configured to route emergency calls to a PSTN trunk by analyzing the received digits. It may nevertheless be desirable to provide the wireless access communication unit 106 with the capability to establish, maintain and tear down emergency calls if it receives a trigger to initiate such a call. The wireless access communication unit 106 may perform these emergency call operations using a GSM-based segment.

In case of a detected failure at the wireless access communication unit 106, an alarm message is transmitted to report the failure to the operator. Upon detection of a fault, the wireless access communication unit 106 sends a fault notification (i.e., alarm message) to the base station 109 using a Control Traffic Transport (CT-TRA) message. The base station 109 then sends a fault report to the base station controller 112 using the base station object as the fault entity.

FIG. 19 is a call flow diagram illustrating alarm reporting. As shown in FIG. 19, a wireless communication channel (e.g., a time slot in a TDMA system, such as described with respect to FIG. 16 or 17) is first acquired if such a channel has not already been established. A service request is then sent to the base station 109 from the wireless access communication unit 106 specifying that a logical link is needed from operations and maintenance type data concerning the wireless access communication unit 106. The service request takes the form of a Control Traffic Service Request (CT-SRQ) message. After receiving an control traffic acknowledgment message from the base station 109, the wireless access communication unit 106 is free to send alarm information to the base station 109. The alarm information may be conveyed in more than one physical message if necessary. After transmitting the alarm information, the wireless access communication unit 106 releases the logical link by sending a Control Traffic Release (CT-REL) message. The base station 109 then packages the alarm information into a base station alarm message format, and sends it to the operations management center (OMC) 120 and/or OSS 122.

The format of an alarm message or alarm information sent by the wireless access communication unit 106 to the base station 109 may include multiple fields, including an identifier field, a failure type field, a status field, a failure cause field, and a log number field. The identifier field contains information identifying the wireless access communication unit 106, such as an international mobile equipment identity (IMEI) number. The failure type field contains information indicating the type of failure that has occurred—e.g., communications failure, quality of service failure, processing failure, or equipment failure. The status field indicates whether the wireless access communication unit 106 is operational or degraded. The failure cause field indicates the reason for the failure, such as a radio unit failure, line card failure, or unknown failure, for example. The log number is used track the alarm. The wireless access communication unit 106 may maintain a log of triggered alarms, each having a corresponding log number. The logged alarm information may be used for debugging at a later time.

If the failure concerns a resource (i.e., hardware or software) at the wireless access communication unit 106, then the alarm report preferably identifies the failing resource if it can be identified. A fault table may be maintained in the control section of the wireless access communication unit 106, so as to keep track of alarms in force. When ever an alarm is reported, an entry is made in the fault table. The fault table helps prevent the same alarm from being reported twice. The fault table may be cleared on power-on or reset.

The base station 109 relays alarms initiated at the wireless access communication unit 106 to the base station controller 112, using a base station alarm message format. The base station alarm message format may include multiple fields, such as a failure type field, fault severity field, failure cause field, and additional information field. The failure type field contains information indicating the type of failure (e.g., an equipment failure), the failure severity field indicates the seriousness of the failure (e.g., "warning"), the failure cause field indicates the source of the field (e.g., the wireless access communication unit 106), and the additional information field generally contains details regarding the failure and, in the specific case of an alarm from the wireless access communication unit 106, contains a copy of the alarm message received from the wireless access communication unit 106.

While one or more embodiments have been described above in accordance with various aspects of the present invention, a number of variations of these embodiments exist incorporating the same or similar principles of operation as described herein. For example, it will be apparent to one skilled in the art that the functionality of the CPE 105 and the wireless access communication unit 106 can be combined into a single unit. Also, one or more telephone stations 102 can be connected directly to the wireless access communication unit 106, bypassing the CPE 105. Also, the CPE 105 need not be connected to the telephone stations 102 with telephone lines, but may be wirelessly connected thereto (i.e., a wireless PBX).

A local area communication system according to certain aspects of the present invention may be comparatively easy to deploy in remote and/or rural areas, in contrast to systems requiring landline connections from a PBX or KTS to the network. With the addition of connecting the wireless access communication unit to the PBX or KTS, a remotely-located local area communication system can obtain benefits of a wireless network (including long distance access) for relatively little extra deployment effort.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A method comprising:
   detecting a fault associated with a hardware or software failure fault in a wireless access communication unit;
   transmitting, over a wireless communication link, a service request message from the wireless access communication unit to a base station of a cellular network in response to the fault;
   receiving an acknowledgement message from the base station;
   transmitting a fault notification message to the base station in response to the acknowledgement, the fault notification message including an identifier field, a failure type field, a status field, a failure cause field, and a log number field; and
   transmitting a release message to the base station after transmitting the fault notification message, wherein the fault notification message received at the base station is to be transmitted as a base station alarm message from the base station to an operations management center.

2. The method of claim 1, wherein detecting a fault comprises detecting either a hardware or software fault in the wireless access communication unit.

3. The method of claim 1, further comprising detecting a quality of service failure fault in the wireless access communication unit.

4. The method of claim 1, further comprising detecting a communication failure fault in the wireless access communication unit.

5. The method of claim 1, wherein transmitting a fault notification message comprises transmitting the fault notification message including a permanent equipment identifier associated with the wireless access communication unit.

6. The method of claim 1, further comprising communicating between a telephone station and said base station over said wireless communication link using said wireless access communication unit as an intermediary.

7. A wireless access communication unit comprising:
   a subscriber port to be coupled to a telephone switch;
   a subscriber interface to be coupled to said subscriber port;
   a radio transceiver to transmit and receive information over a wireless connection to a wireless base station; and
   a controller to manage data transfer between said radio transceiver and said subscriber interface, and to cause said radio transceiver to transmit a fault notification message to the wireless base station in response to a fault in the wireless access communication unit, the fault notification message including an identifier field, a failure type field, a status field, a failure cause field, and a log number field, the controller further causing said radio transceiver to:
   transmit a service request message to the base station in response to the fault;
   receive an acknowledgement message from the base station in response to the service request message before transmitting the fault notification message; and
   transmit a release message to the base station after transmitting the fault notification message.

8. The wireless access communication unit of claim 7, wherein said fault comprises either a hardware or software failure fault in the wireless access communication unit.

9. The wireless access communication unit of claim 7, wherein said fault comprises a quality of service failure fault in the wireless access communication unit.

10. The wireless access communication unit of claim 7, wherein said fault comprises a communication failure fault in the wireless access communication unit.

11. The wireless access communication unit of claim 7, wherein said alarm message comprises a permanent equipment identifier associated with the wireless access communication unit.

12. A method comprising steps of:
    a step for detecting a fault associated with a wireless access communication unit;
    a step for transmitting, over a wireless communications link, a service request message from the wireless access communication unit to a base station of a cellular network in response to the fault;
    a step for receiving an acknowledgement message from the base station;
    a step for transmitting a fault notification message to the base station in response to the acknowledgement, the fault notification message including an identifier field, a failure type field, a status field, a failure cause field, and a log number field; and
    a step for transmitting a release message to the base station after transmitting the fault notification message, said fault notification message after being received at said base station being transmitted as a base station alarm message from the base station to an operations management center.

13. The method of claim 12, wherein the step of detecting a fault comprises a step for detecting one or more of a hardware, a software, a quality of service, and a communication failure in the wireless access communication unit.

14. The method of claim 12, further comprising a step for communication between a telephone station and the base station over the wireless communication link using the wireless access communication unit as an intermediary.

15. The method of claim 12, wherein the step for transmitting a fault notification method comprises a step for transmitting the fault notification message including a permanent equipment identifier associated with the wireless access communication unit.

16. An apparatus comprising:
    a subscriber port means to be coupled to a telephone switch means;
    a subscriber interface means to be coupled to said subscriber port means;
    a radio transceiver means for transmitting and receiving information over a wireless connection means to a wireless base station means, and
    a controller means for managing data transfer between the radio transceiver means and the subscriber interface means and for causing the radio transceiver means to transmit a fault notification message to the wireless base station means in response to a fault in the apparatus, the fault notification message including an identifier field, a failure type field, a status field, a failure cause field, and a log number field, the controller means further causing said radio transceiver means to:

transmit a service request message to the wireless base station means in response to the fault;

receive an acknowledgement message from the wireless base station means in response to the service request message before transmitting the fault notification message; and transmit a release message to the wireless base station means after transmitting the fault notification message.

17. The apparatus of claim 16, wherein fault comprises one or more of a hardware, a software, a quality of service, and a communication failure in the apparatus.

18. The apparatus of claim 16, wherein the alarm message means comprises a permanent equipment identifier associated with the apparatus.

19. A method comprising:

receiving, over a wireless communications link, a service request message from a wireless access communication unit at a base station of a cellular network in response to the wireless access communication unit detecting a fault in the wireless access communication unit;

transmitting an acknowledgement message from the base station to the wireless access communication unit;

receiving a fault notification message from the wireless access communication unit in response to the acknowledgement, the fault notification message including an identifier field, a failure type field, a status field, a failure cause field, and a log number field;

receiving a release message from the wireless access communication unit after receiving said fault notification message at said base station; and transmitting, in response to said fault notification message, a base station alarm message from the base station to an operations management center.

20. The method of claim 19, wherein transmitting a fault notification message comprises transmitting the fault notification message including a permanent equipment identifier associated with the wireless access communication unit.

21. The method of claim 19, further comprising communicating between a telephone station and said base station over said wireless communication link using said wireless access communication unit as an intermediary.

22. A wireless base station of a cellular network comprising:

a cellular network radio transceiver to:

receive, over a wireless communications link of the cellular network, a service request message from a wireless access communication unit at the base station in response to the wireless access communication unit detecting a fault in the wireless access communication unit;

transmit an acknowledgement message from the base station to the wireless access communication unit;

receive a fault notification message from the wireless access communication unit in response to the acknowledgement, the fault notification message including an identifier field, a failure type field, a status field, a failure cause field, and a log number field; and to receive a release message from the wireless access communication unit after receiving said fault notification message at said base station; and a management communications transceiver to transmit, in response to said fault notification message, a base station alarm message from the base station to an operations management center.

23. The wireless base station of claim 22, wherein the fault notification message comprises a permanent equipment identifier associated with the wireless access communication unit.

24. The wireless base station of claim 22, wherein the cellular network radio transceiver is further to communicate between a telephone station and said base station over said wireless communication link using said wireless access communication unit as an intermediary.

\* \* \* \* \*